(12) United States Patent
Schmidt et al.

(10) Patent No.: US 7,587,721 B2
(45) Date of Patent: Sep. 8, 2009

(54) SHARING OBJECTS IN RUNTIME SYSTEMS

(75) Inventors: Oliver Schmidt, Worth am Rhein (DE);
Norbert Kuck, Karlsruhe (DE); Edgar Lott, Nussloch (DE); Martin Strassburger, Oestringen (DE); Arno Hilgenberg, Mannheim (DE); Ralf Schmelter, Wiesloch (DE); Jan Dosert, Nussloch (DE)

(73) Assignee: SAP AG, Walldorf (DE)

( * ) Notice: Subject to any disclaimer, the term of this patent is extended or adjusted under 35 U.S.C. 154(b) by 1185 days.

(21) Appl. No.: 10/851,813

(22) Filed: May 20, 2004

(65) Prior Publication Data
US 2005/0262512 A1 Nov. 24, 2005

(51) Int. Cl.
*G06F 3/00* (2006.01)
*G06F 9/44* (2006.01)

(52) U.S. Cl. .............. 719/319; 719/330; 719/312; 717/116

(58) Field of Classification Search .............. 719/328, 719/330, 310, 312, 319; 717/116
See application file for complete search history.

(56) References Cited

U.S. PATENT DOCUMENTS

| 5,307,490 | A | * | 4/1994 | Davidson et al. ............ 719/328 |
| 5,999,988 | A | | 12/1999 | Pelegri-Llopart et al. |
| 6,253,256 | B1 | * | 6/2001 | Wollrath et al. ............ 719/330 |
| 6,272,559 | B1 | * | 8/2001 | Jones et al. ................ 719/330 |
| 7,325,233 | B2 | * | 1/2008 | Kuck et al. ................ 718/103 |
| 7,451,434 | B1 | * | 11/2008 | Blumenthal et al. ......... 717/116 |
| 2003/0028865 | A1 | | 2/2003 | Sokolov et al. |
| 2003/0135583 | A1 | | 7/2003 | Yared et al. |

FOREIGN PATENT DOCUMENTS

WO WO 03/040919 5/2003
WO PCT/EP2005/005502 5/2005

* cited by examiner

*Primary Examiner*—Lechi Truong
(74) *Attorney, Agent, or Firm*—Blakely, Sokoloff, Taylor & Zafman LLP

(57) ABSTRACT

Method, apparatus and system for data sharing in runtime systems are described. A set of data objects is identified, where each data object in the set of data objects comprises a reference to runtime metadata about the data object in a first runtime system. For each data object in the set of data objects, the reference to the runtime metadata in the data object is replaced with a proxy. The set of data objects is transmitted to a second runtime system. The transmitting of the set of data objects includes replacing the proxy with the reference to the runtime metadata for each of the set of data objects transmitted to the second runtime system. Further, a shared memory is associated with the first runtime system and the second runtime system such that the first and second runtime systems share us information at the shared memory.

8 Claims, 16 Drawing Sheets

SHARING OBJECTS IN RUNTIME SYSTEMS

BACKGROUND

The present application relates to data processing.

Some servers, such as enterprise servers or other large servers, can generally be characterized as request processing engines, as they process large numbers of typically small user requests belonging to user sessions. The processing of a request usually involves the running of user code (e.g., Java servlets or Enterprise Java Beans) in a runtime system (e.g., a Java virtual machine) executing on a server. Scalability in such a server is traditionally achieved through the use of threads—e.g., a multi-threaded virtual machine (VM) is used to process requests corresponding to a number of user sessions. System robustness requires strong isolation between user sessions, however, and that can be difficult to achieve when a large number of user sessions are running within a single VM.

Operating systems can provide nearly perfect isolation for processes. In some operating systems, a crashed process will not affect other processes, and will not leak or leave behind allocated resources. It is conceptually possible to isolate user sessions and thus increase the robustness of a server by allocating one operating system (OS) process for each user session, and running a VM for that user session within the allocated process. However, such an approach may not be practical in some situations (e.g., where there are a large number of user sessions), due to the OS scheduling overhead that would be incurred in switching between the correspondingly large number of processes, and also due to the resources that such an approach would consume. OS processes are generally not designed to model entities as fine-grained as user sessions.

SUMMARY

The present invention provides methods and apparatus, including computer program products, that implement techniques for sharing data, and for providing isolation between user sessions.

In one general aspect, the techniques feature a computer program product that is operable to cause data processing apparatus to receive an identification of a first data object, the first data object being an instance of a first runtime class, determine whether the first runtime class is shareable, and determine whether the first data object references one or more referenced data objects. If the first data object does reference one or more referenced data objects, the computer program product is further operable to cause the data processing apparatus to traverse the one or more referenced data objects, and, for each traversed data object, determine whether a runtime class of which the traversed data object is an instance is shareable.

Advantageous implementations can include one or more of the following features. Traversing the one or more referenced data objects can include recursively traversing each data object in a transitive closure of the one or more referenced data objects.

If the first runtime class is shareable and the runtime class of each traversed data object is shareable, the first data object and each traversed data object can be grouped into an object group, and the object group can be copied into a shared memory area.

If the first runtime class is not shareable, or if the runtime class of at least one traversed data object is not shareable, a negative status indication can be generated.

Determining whether the first runtime class is shareable can include determining whether the first runtime class has been previously declared to be shareable.

The first runtime class can be derived from one or more base classes and can include one or more fields. Determining whether the first runtime class is shareable can include determining whether the first runtime class implements a serialization interface, determining whether custom code is executed during serialization or deserialization of an object instance of the first runtime class, determining whether all the base classes are serializable, determining whether all the fields are serialized, and determining whether the object instance of the first runtime class affects garbage collection.

The first runtime class can be a Java class, and the serialization interface can be java.io.Serializable.

Determining whether custom code is executed can include determining whether the first runtime class includes a method in a predetermined set of methods. The predetermined set of methods can include readObject( ), writeObject( ), readExternal( ), writeExternal( ), readResolve( ), and writeReplace( ) methods.

Determining whether all the base classes are serializable can include determining whether each class in the base classes implements the serialization interface, and, if a class in the base classes does not implement the serialization interface, determining whether the class includes a trivial default constructor.

Determining whether all the fields are serialized can include determining whether any of the fields is a transient field. Determining whether all the fields are serialized can also include determining whether any of the fields is a serialPersistentFields field.

Determining whether an object instance of the first runtime class affects garbage collection can include determining whether the first runtime class comprises a trivial finalizer. Where the first runtime class is a Java class, determining whether an object instance of the first runtime class affects garbage collection can also include determining whether the first runtime class is derived from the java.lang.ref.Reference class.

Determining whether the first runtime class is shareable can further include determining whether a runtime representation of the first runtime class is shareable, and determining whether a class loader for the first runtime class is shareable.

Determining whether the runtime representation of the first runtime class is shareable can include determining whether the runtime representation is stored at a first predetermined location. Determining whether the class loader for the first runtime class is shareable can include determining whether the class loader is stored at a second predetermined location.

In another aspect, the techniques feature a computer program product that is operable to cause data processing apparatus to receive an identification of a first data object in a first runtime system, the first data object referencing zero or more referenced data objects, identify a shared closure of data objects that consists of the first data object and a transitive closure of the referenced data objects, and determine whether the shared closure of data objects is usable in a second runtime system.

Advantageous implementations can include one or more of the following features. The first and second runtime systems can be virtual machines, including Java virtual machines or Common Language Runtime virtual machines. The shared closure of data objects can include user context information.

Determining whether the shared closure is usable in the second runtime system can include determining whether each data object in the shared closure of data objects is serializable without execution of custom code.

Determining whether the shared closure is usable in the second runtime system can include determining whether the runtime class of each data object in the shared closure is shareable.

The runtime class of which each data object is an instance can be derived from one or more bases classes and can have one or more fields, and determining whether the runtime class is shareable can include determining whether the runtime class implements a serialization interface, determining whether custom code is executed during serialization or deserialization of an object instance of the runtime class, determining whether all the base classes are serializable, determining whether all the fields are serialized, and determining whether an object instance of the runtime class affects garbage collection.

A negative status indication can be generated if the shared closure of data objects is not usable in the second runtime system.

The shared closure of data objects can be copied to a shared memory area. The computer program product can be further operable to cause the data processing apparatus to determine whether a previous version of the shared closure of data objects exists in the shared memory area, and to associate a version number with the shared closure of data objects.

In another aspect, the techniques feature a computer program product that is operable to cause data processing apparatus to receive an identifier, identify a shared closure associated with the identifier, and associate the shared closure with a runtime system. The shared closure is located in a shared memory area and consists of a first data object and the transitive closure of data objects referenced by the first data object.

Advantageous implementations can include one or more of the following features. The runtime system can be a Java virtual machine or a Common Language Runtime virtual machine. Identifying the shared closure can include identifying a current version of the shared closure.

The shared closure can be associated with the runtime system by mapping or copying the shared closure into an address space associated with the runtime system. Where the shared closure is mapped into an address space associated with the runtime system, associating the shared closure with the runtime system can further include preventing write access to the shared closure, or, upon detecting a first write access to a data object in the shared closure, copying the shared closure into the address space associated with the runtime system.

A shared closure can be marked as deleted. Marking a shared closure as deleted can include preventing the shared closure from being associated with additional runtime systems.

In another aspect, the techniques feature a computer program product that is operable to cause data processing apparatus to identify a set of data objects, each data object in the set of data objects having a reference to runtime metadata about the data object in a first runtime system. The computer program product is further operable to cause the data processing apparatus to replace the reference to the runtime metadata in each data object with a proxy, and to transmit the set of data objects to a second runtime system.

Advantageous implementations can include one or more of the following features. For each data object in the set of data objects, the reference to the runtime metadata about the data object can include a reference to a runtime representation of a class of which the data object is an instance.

The first runtime system can include a first virtual machine, and the second runtime system can include a second virtual machine. The first and second virtual machines can be Java virtual machines or Common Language Runtime virtual machines. The first runtime system can be located on a first physical machine, and the second runtime system can be located on a second, distinct physical machine.

Identifying the set of data objects can include identifying a transitive closure of one or more referenced data objects, where each referenced data object is an object that is referenced by a first data object.

In another aspect, the techniques feature a computer program product that is operable to cause data processing apparatus to receive a set of data objects from a first runtime system, where each data object in the set of data objects contains a proxy, copy the set of data objects into a second runtime system, and, for each data object in the set of data objects, identify runtime metadata about the data object and replace the proxy in the data object with a reference to the runtime metadata about the data object.

Advantageous implementations can include one or more of the following features. The computer program product can be further operable to determine if the runtime metadata about each data object is available in the second runtime system, and to install the runtime metadata about each data object in the second runtime system if that runtime metadata is not available in the second runtime system.

For each data object, the reference to the runtime metadata about the data object can include a reference to a runtime representation of a class of which the data object is an instance. The computer program product can be further operable to determine if the runtime representation of the class of each object instance is available in the second runtime system, and to install the runtime representation of the class of each object instance in the second runtime system if that runtime representation is not available in the second runtime system.

The first runtime system can include a first virtual machine and the second runtime system can include a second virtual machine. The first and second virtual machines can be Java virtual machines or Common Language Runtime virtual machines. The first runtime system can be located on a first physical machine, and the second runtime system can be located on a second, distinct physical machine.

The set of data objects can consist of a first data object and a transitive closure of one or more referenced data objects, where each referenced data object is an object that is referenced by the first data object.

The operations to identify the runtime metadata and to replace the proxy in each data object in the set of data objects can occur substantially immediately after the set of data objects is received. Alternatively, those operations can occur as each data object is accessed in the second runtime system.

In another aspect, the techniques feature a computer program product that is operable to cause data processing apparatus to initialize a runtime system for a user session, create a shared closure of data objects in a shared memory area, receive a request corresponding to the user session, select a first process from a set of operating system processes, bind the runtime system to the first process, and associate the shared closure of data objects with the runtime system. The shared closure of data objects consists of a first data object and a transitive closure of one or more referenced data objects, each referenced data object being referenced by the first data object.

Advantageous implementations can include one or more of the following features. The runtime system can include a virtual machine. The virtual machine can be a Java virtual machine or a Common Language Runtime virtual machine.

The shared closure of data objects can include user context information corresponding to the user session.

Associating the shared closure with the runtime system can include binding the shared closure to the first process. Binding the shared closure to the first process can include mapping or copying the shared closure into the address space of the first process. If the shared closure is mapped into the address space of the first process, binding the shared closure can further include preventing write access to the shared closure, or, upon detecting a first write access to one of the data objects in the shared closure, copying the shared closure into the address space of the first process.

The computer program product can be further operable to cause the data processing apparatus to initialize a second runtime system for a second user session, receive a second request corresponding to the second user session, select a second process from the set of operating system processes, bind the second runtime system to the second process, and associate the shared closure of data objects with the second runtime system.

In another aspect, the techniques feature a computer program product that is operable to cause data processing apparatus to store a user context corresponding to a user session in a shared memory area, receive a request corresponding to the user session, select a process having an address space from a set of operating system processes, select a runtime system from a set of runtime systems, bind the runtime system to the process, and associate the user context with the runtime system.

Advantageous implementations can include one or more of the following features. Each runtime system in the set of runtime systems can include a virtual machine. A virtual machine can be a Java virtual machine or a Common Language Runtime virtual machine.

The user context can include a shared closure that consists of a first data object and the transitive closure of data objects referenced by the first data object.

The runtime system can be stored in the shared memory area, and binding the runtime system to the process can include mapping a portion of the shared memory area corresponding to the runtime system into the address space of the process.

Associating the user context with the runtime system can include binding the user context to the process. Binding the user context to the process can include mapping or copying the user context into the address space of the process. If the user context is mapped into the address space of the process, binding the user context can further include copying the user context into the address space of the process upon detecting a first write access to the user context.

The computer program product can be further operable to cause the data processing apparatus to unbind the user context from the process. Unbinding the user context from the process can include copying the user context to the shared memory area. Unbinding the user context from the process can further include determining if a previous version of the user context exists in the shared memory area, and creating a new version of the user context in the shared memory area if a previous version of the user context does exist.

Upon detecting that the process is blocked, both the runtime system and the user context can be unbound from the process. Detecting that the process is blocked can include detecting that the process is waiting for an input/output (I/O) event to complete. Upon detecting that the I/O event has completed, an available process can be selected from the set of operating system processes, and the runtime system and the user context can be bound to the available process.

The computer program product can be further operable to cause the data processing apparatus to unbind the runtime system from the process.

The set of operating system processes can be distributed across two or more physical machines, and the process can be executing on a first machine from the two or more physical machines. The user context can include a first data object with a proxy. Associating the user context with the runtime system can include replacing the proxy with a reference to runtime metadata about the first data object, the runtime metadata being stored on the first machine.

In another aspect, the techniques feature a computer server having a set of processes, a set of runtime systems, a shared memory area for storing a plurality of user contexts, and a dispatcher component. The dispatcher component is operable to receive a request corresponding to a user context in the plurality of user contexts, select an available process from the set of processes, select an available runtime system from the set of runtime systems, and transmit an identification of the user context and the available runtime system to the available process for processing of the request.

Advantageous implementations can include one or more of the following features. Each runtime system in the set of runtime systems can include a virtual machine. The virtual machine can be a Java virtual machine or a Common Language Runtime virtual machine. The number of processes in the set of processes can be set to be less than or equal to the number of runtime systems in the set of runtime systems.

In another aspect, the techniques feature a computer program product that is operable to cause data processing apparatus to initialize a runtime system in each process in a set of processes, store a user context corresponding to a user session in a shared memory area, receive a request corresponding to the user session, select a process from the set of processes, and associate the user context with the runtime system in the selected process to process the request.

Advantageous implementations can include one or more of the following features. Associating the user context with the runtime system in the selected process can include binding the user context to the selected process. The runtime system in each process can include a virtual machine. The virtual machine can be a Java virtual machine or a Common Language Runtime virtual machine.

The techniques described herein can be implemented to realize one or more of the following advantages. The techniques can generally be used to disassemble a complex data structure in one runtime system and reassemble it in the native format of another runtime system. More specifically, the techniques can be used to share objects between runtime systems (e.g., VMs). Shareable classes and shareable object instances can be identified automatically. Classes that are not automatically identified as shareable can be analyzed manually to determine if they are nevertheless shareable. Shareable objects can be grouped into sets called shared closures, which can be associated with multiple runtime systems. Multiple types of objects can be shared (including, e.g., objects that constitute a user context), and multiple versions of an object can be created and shared. Shared objects can be accessed through multiple mechanisms, including mapping and copying the shared objects from a shared memory area into address spaces associated with one or more runtime systems. Access to shared objects can be restricted, so as to prevent runtime systems from overwriting data in the shared objects in a manner that renders them invalid or unusable in other runtime systems. Shared objects can also be marked as deleted and garbage collected.

Objects can be shared between runtime systems on different physical machines (e.g., in cluster architectures). References to runtime metadata in a source runtime system can be identified and replaced with references to runtime metadata in a target runtime system. Runtime metadata can be loaded into a target system, and references to such runtime metadata can be plugged in either eagerly or lazily (e.g., on demand). The sharing of objects can reduce resource consumption (e.g., less memory may be used since objects can be shared by multiple runtime systems), as well as time consumption (e.g., less time may be used since shared objects do not have to be created or initialized in multiple runtime systems).

The techniques described herein can also be used to provide isolation between user sessions in a scalable manner, thereby enabling a server to robustly process requests corresponding to a large number of user sessions. User sessions can be isolated by allocating one VM for each user session, and binding the VMs to OS work processes in order to process requests. The number of work processes can be adjusted to increase throughput (e.g., the number of work processes can be set to match the number of processors allocated to the server). The VMs can share objects, including user contexts, to reduce resource and time consumption.

Alternatively, rather than allocating one VM for each user session, VMs can also be shared between user sessions. Thus, a server can be implemented with a fixed number of VMs. A server can also be implemented with a variable but limited (i.e., maximum) number of VMs. Sharing VMs between user sessions can reduce the overhead per user session, especially in environments where user contexts are small. Despite the sharing of VMs, user sessions can nevertheless remain isolated by attaching only one VM and one user context to each work process, and using the attached VM to process requests corresponding to the user session of the attached user context. Throughput can still be optimized, because both user contexts and VMs can be bound to and executed in a process as soon as a work process is available.

To share VMs in an isolated manner as described above, user contexts can be dissociated from the VMs. The user contexts can be accessed or shared by multiple VMs, e.g., by storing the user contexts in a shared memory area that is accessible by all the VMs in a server. Requests can be processed by binding a VM to a work process, associating the relevant user context with the VM, and executing the VM in the work process with the associated user context. By associating only one VM and one user context with a process at a time, user sessions can be isolated from each other, so that if a VM or a work process crashes, only the associated user session may be affected.

Multiple mechanisms can be used to associate user contexts with VMs, and multiple types of access can be provided to the data in the user contexts. Throughput can be optimized through the use of low-cost mechanisms to associate user contexts with VMs (e.g., mapping user contexts and VMs into processes), as well as by detaching blocking VMs from their work processes and using those work processes to work on other requests. User contexts can be shared in cluster architectures, where VMs are distributed across multiple physical machines. A dispatcher process or component can be used to distribute requests among VMs in a manner that distributes the overall workload or that minimizes the need to share user contexts across machines. User contexts can be shared between VMs (and VMs can therefore be shared between user sessions) even if VMs are permanently bound to work processes.

Allocating a separate VM for each user session, or sharing VMs in an isolated manner as described above, can produce accountability in terms of resource consumption. Although it can be straightforward to monitor the consumption of resources for a particular VM or operating system process, it can be quite difficult to determine which part of a program running in a VM or process is responsible for the consumption of a particular resource (e.g., memory, processing time, or time used for garbage collection). If there is only one user context executing in a VM at a time, however, resources can be accounted for on a per-user session basis, which is often desirable.

One implementation of the invention provides all of the above advantages.

These general and specific aspects can be implemented using a computer program, a method, a system or apparatus, or any combination of computer programs, methods, or systems. Details of one or more embodiments of the invention are set forth in the accompanying drawings and in the description below. Other features, objects, and advantages of the invention will be apparent from the description, the drawings, and the claims.

BRIEF DESCRIPTION OF THE DRAWINGS

Like reference numbers and designations in the various drawings indicate like elements.

DETAILED DESCRIPTION

Isolating User Sessions

Figure 1:
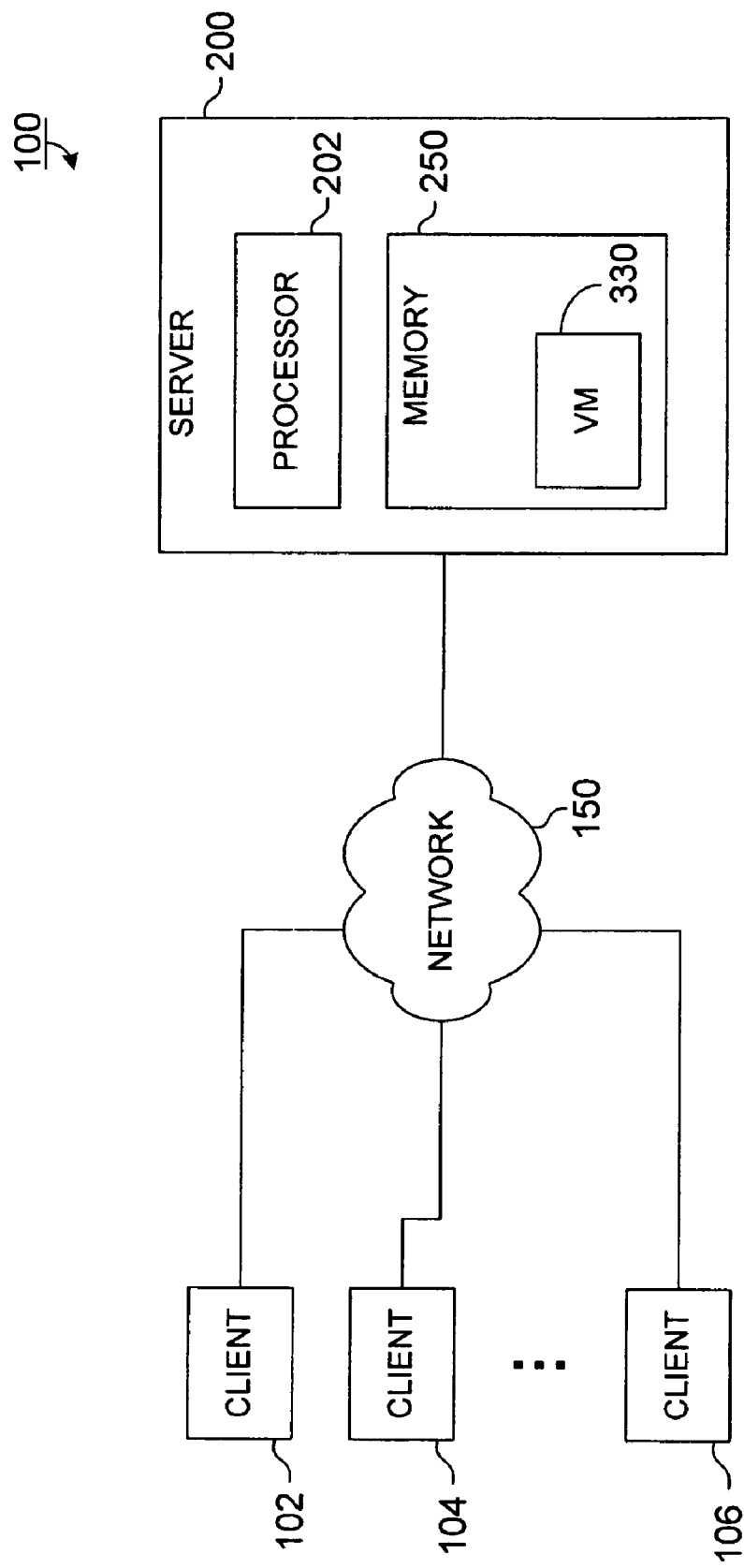
FIG. 1 is a block diagram of a client/server system.

FIG. 1 illustrates a client/server system 100 in which a network 150 links a server 200 to client systems 102, 104, 106. The server 200 is a programmable data processing system suitable for implementing apparatus, programs, or methods in accordance with the invention. The server 200 provides a core operating environment for one or more runtime systems that process user requests. The server 200 includes a processor 202 and a memory 250. The memory 250 can be used to store an operating system, a Transmission Control Protocol/Internet Protocol (TCP/IP) stack for communicating over the network 150, and machine-executable instructions executed by the processor 202. In some implementations, the server 200 can include multiple processors, each of which can be used to execute machine-executable instructions. The memory 250 can include a shared memory area 255 (shown in subsequent figures) that is accessible by multiple operating system processes executing in the server 200. An example of a suitable server that can be used in the client/server system 100 is a Java 2 Platform, Enterprise Edition (J2EE) compatible server, such as the Web Application Server developed by SAP AG of Germany (SAP), or the WebSphere Application Server developed by IBM Corp. of Armonk, N.Y.

Client systems 102, 104, 106 can execute multiple applications or application interfaces. Each instance of an application or an application interface can constitute a user session. Each user session can generate one or more requests to be processed by the server 200. The requests can include instructions to be executed on a runtime system (e.g., the VM 330) on the server 200.

A runtime system is a code execution environment that executes instructions or code in user requests and that provides runtime services for that code. Core runtime services can include functionality such as process, thread, and memory management (e.g., laying out objects in the server memory 250, sharing objects, managing references to objects, and garbage collecting objects). Enhanced runtime services can include functionality such as error handling and establishing security and connectivity.

One example of a runtime system is a virtual machine. A virtual machine (VM) is an abstract machine that can include an instruction set, a set of registers, a stack, a heap, and a method area, like a real machine or processor. A VM essentially acts as an interface between program code and the actual processor or hardware platform on which the program code is to be executed. The program code includes instructions from the VM instruction set that manipulates the resources of the VM. The VM executes instructions on the processor or hardware platform on which the VM is running, and manipulates the resources of that processor or hardware platform, so as to effect the instructions of the program code. In this way, the same program code can be executed on multiple processors or hardware platforms without having to be rewritten or re-compiled for each processor or hardware platform. Instead, a VM is implemented for each processor or hardware platform, and the same program code can be executed in each VM. The implementation of a VM can be in code that is recognized by the processor or hardware platform. Alternatively, the implementation of a VM can be in code that is built directly into a processor.

As an example, a Java source program can be compiled into program code known as bytecode. Bytecode can be executed on a Java VM running on any processor or platform. The Java VM can either interpret the bytecode one instruction at a time, or the bytecode can be further compiled for the real processor or platform using a just-in-time (JIT) compiler.

In addition to Java VMs, other examples of VMs include Advanced Business Application Programming language (ABAP) VMs and Common Language Runtime (CLR) VMs. ABAP is a programming language for developing applications for the SAP R/3 system, a widely installed business application system developed by SAP. The Common Language Runtime is a managed code execution environment developed by Microsoft Corp. of Redmond, Wash. For purposes of simplicity, the discussion in this specification focuses on virtual machines, but it is to be understood that the techniques described herein can also be used with other types of runtime systems.

In order to isolate user sessions from each other and thereby increase the robustness of the system, the server 200 can be implemented so that each user session is provided with its own VM. More specifically, each user session can be provided with its own process-attachable virtual machine (PAVM), which is a VM that can be attached to and detached from an OS process.

Figure 2:
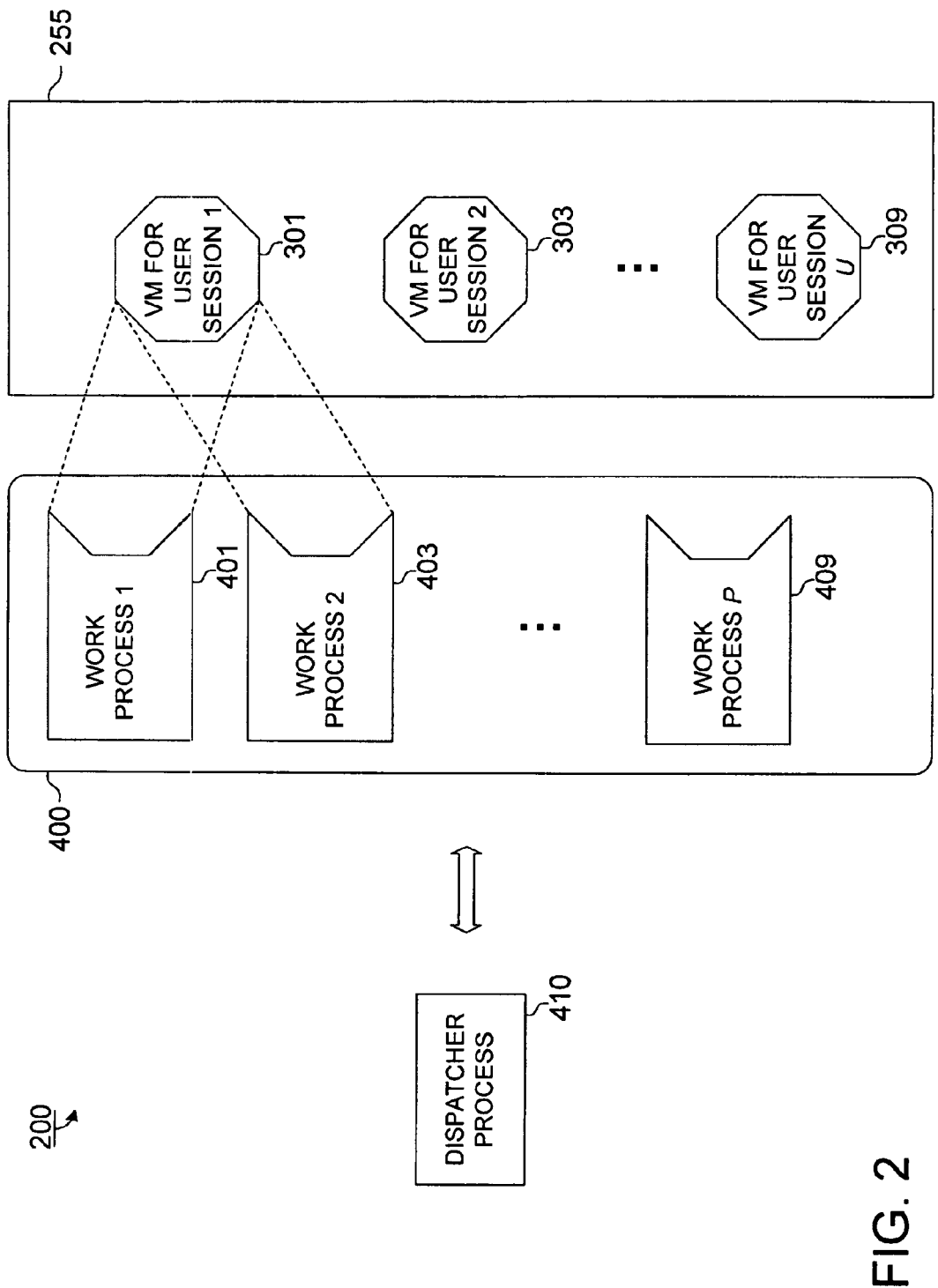
FIG. 2 is a block diagram of a server in the client/server system of FIG. 1.

FIG. 2 illustrates an implementation of the server 200 that uses process-attachable VMs. A process-attachable VM is instantiated and used for each user session—for example, VM 301 is instantiated and used for user session 1, and VM 303 is instantiated and used for user session 2. In general, if there are U user sessions, the server 200 will have U corresponding VMs. This is shown conceptually in FIG. 2 by VM 309, which corresponds to user session U.

The implementation of server 200 shown in FIG. 2 also includes a shared memory area 255, which is used to store the process-attachable VMs, a pool 400 of work processes, and a dispatcher process 410. The pool 400 of work processes contains a number of operating system processes that are allocated to the server 200—e.g., work processes 401, 403, and 409. In general, P work processes can be allocated to the server 200, as shown conceptually in FIG. 2 by the work process 409. In order to reduce synchronization overhead and the number of context switches, the number of operating system processes P allocated to the server 200 should be roughly equal to the number of processors available on the computer on which the server 200 is running. However, the benefits of increased isolation and robustness can be achieved even when the server 200 uses only one operating system process to process user requests.

In operation, when the server 200 in FIG. 2 receives a request, a special process (the dispatcher process 410) dispatches the request to one of the available work processes in the work process pool 400. Assuming that the request corresponds to user session 1 (which in turn corresponds to the VM 301), and that the dispatcher process 410 dispatches the request to work process 401, the server 200 attaches or binds the VM 301 to work process 401 in order to process the request. After the request has been processed, the server can detach VM 301 from the work process 401. Work process 401 can then be used to process another request. For example, if the server 200 receives a new request that corresponds to user session 2, and the dispatcher process 410 dispatches that request to the work process 401, the corresponding VM 303 can be attached to the work process 401 to process the new request. Continuing with this example, if the server 200 receives another request corresponding to user session 1 while work process 401 is still being used to process the request corresponding to user session 2, the dispatcher process 410 can dispatch the new request from user session 1 to work process 403, and the VM 301 for user session 1 can be attached to the work process 403 in order to process the new request from user session 1.

The server 200 is not required to have a dispatcher process 410. For example, in an alternative implementation, user requests can be serially assigned to processes allocated to the server 200. Each process could maintain a queue of requests, and attach the process-attachable VM of the user session corresponding to the request at a front of the queue in order to process that request.

As mentioned above, a process-attachable VM is a VM that can be attached to and detached from an OS process. In order to be able to detach a VM from a process (and to attach the VM to another process), the affinity between the VM and the process in which the VM runs needs to be removed. When a VM is detached from a process, the state of the VM needs to be persisted. When the VM is attached to another process, the state of the VM needs to be unpersisted. Thus, the state of the VM needs to be generated and maintained in a manner that enables the state to be persisted and unpersisted. Moreover, persisting the state of the VM when detaching the VM from a process, and unpersisting the state of the VM when attaching the VM to a different process, should preferably be low cost operations. This can be achieved by storing the state of the VM in a shared memory area that is accessible to the OS processes allocated to the server.

In order for a VM that is located in shared memory to access a user context corresponding to a user session, the user context—including both a user heap and a user stack—must also be located in shared memory. (Alternatively, the user context can be copied into the address space of the process to which the VM is bound—such an implementation is discussed in more detail below.) Thus, in one implementation of the server 200, user contexts are also stored in shared memory. Storing a user heap in shared memory is straightforward—memory for the heap can simply be allocated from a shared memory segment. Storing the user stack can be more difficult because in some instances, such as with Java VMs, the user stack and the VM stack are intermixed. In this situation, one solution is to store the complete stack of the VM, including the user stack, in shared memory. In one implementation, this is accomplished by implementing a VM as an operating system co-routine.

Typical subroutines display a hierarchical relationship. For example, subroutine A suspends on invoking subroutine B, which on termination returns control to subroutine A, which resumes execution from the point of suspension. In contrast, co-routines have a parallel rather than a hierarchical relationship. Thus, for example, co-routine A suspends on invoking co-routine B, but co-routine B also suspends on returning control to co-routine A. To co-routine B, this return of control appears to be an invocation of co-routine A. When co-routine A subsequently invokes co-routine B and suspends, co-routine B behaves as though its previous invocation of co-routine A has returned, and it resumes execution from the point of that invocation. Control thus bounces between the two co-routines, each one resuming where it previously left off.

Co-routines can be compared to threads, since in some implementations co-routines each have their own stack and share a heap. One difference between threads and co-routines, however, is that whereas the operating system takes care of scheduling between threads, a programmer has to take care of scheduling between co-routines. Co-routines can be used to simulate threads, as explained below. For example, a set of functions within the Linux glibc library, including the setcontext( ), getcontext( ), makecontext( ), and swapcontext( ) functions, can be used to start a new co-routine within a process, to switch between co-routines, and importantly, to provide memory for the stack of a co-routine. This last feature can be used to allocated the stack of a VM from (and thus to store the stack in) shared memory.

In one implementation of the server 200, when a user session starts, a process-attachable VM corresponding to the user session is generated and initialized. A private block of shared memory, called a "session memory," is allocated to the VM. The VM's heap and stacks are allocated directly from this private block of shared memory. Using shared memory to store the state of the VM makes the process of binding or attaching the VM to an OS process essentially a non-operation, since the operating system process can simply map the VM's session memory into its address space. Similarly, the process of detaching the VM from the OS process simply requires unmapping of the VM's session memory from the address space of the OS process. No data is actually moved or copied.

In order to be able to detach a VM from a process (and to attach the VM to another process), input/output (I/O) resources used by the VM, such as file handles and sockets, also need to be persisted. The I/O resources used by the VM need to be generated and maintained in a manner that enables the resources to be persisted and unpersisted. This can be accomplished by using an additional level of indirection to access I/O resources (or proxies for such resources). For example, what a VM sees as a file or socket descriptor is actually just a handle to the file or socket. A handle can be persistable by itself, e.g., a file handle can be stored in the VM's session memory. Alternatively, a handle can be made persistable through the use of a resource manager—e.g., in the case of sockets, descriptor passing can be used to notify a socket manager about an I/O request for a specific socket; a socket manager can then notify the dispatcher when the I/O request is completed.

Some VMs may be multi-threaded. A thread is essentially placeholder information that enables a program to handle multiple concurrent users or service requests within a single use of the program. From the program's point-of-view, a thread is the information needed to serve one individual user or a particular service request. If multiple users are using the program concurrently or if the program receives concurrent requests, a thread is created and maintained for each such user or request. The thread allows the program to know which user or request is being served as the program alternatively gets re-entered on behalf of different users or requests.

Native OS threads cannot easily be persisted to shared memory. Thus, in order to be able to detach a multi-threaded VM from a process (and to attach the VM to another process), native threads can be simulated by a user-level mechanism. Employing a user-level mechanism to simulate native threads is sometimes referred to as providing "green thread" functionality. Green threads are user-level threads that are scheduled by the user rather than by the operating system.

One mechanism that can be used to simulate native threads is operating system co-routines. As explained above, co-routines are similar to threads, except that the programmer (rather than the operating system) takes care of scheduling between co-routines. Native OS threads that are used to implement VM threads can thus be mapped to co-routines. All data structures related to thread management and scheduling, including the threads' call stacks, mutexes, and condition variables for Java monitors, can be kept in a VM's session memory. In the case of a Java VM, that can include both the Java stacks and the C stacks used by the VM implementation, e.g., for the Java Native Interface (JNI) implementation of dynamic method invocation.

Operating systems typically schedule threads preemptively in order to maximize fairness (i.e., in order to give each thread a chance to run at some point). In contrast, co-routine scheduling, which is handled by the programmer, is usually not preemptive. That is not necessarily a drawback, however, for in the context of servers, request throughput is often more important than fairness. Request throughput, which is a primary objective for scalability, can be maximized by using a batch processing strategy to schedule co-routines. In a batch processing strategy, within each VM, each co-routine yields cooperatively to a scheduler (sometimes still referred to as a thread scheduler) when entering a wait state (e.g., when blocking on I/O or on a monitor such as a Java monitor). Coordination between blocking I/O calls and the thread scheduler can be included as part of the I/O redirection mechanism described above. Mutexes and condition variables can be implemented without using operating system locking primitives as scheduler-controlled variables in session memory.

Co-routine scheduling can continue for a PAVM until all its co-routines have entered a wait state, indicating that the user request is either completed or waiting for I/O. In either case, the PAVM can be detached from the work process. The dispatcher process 410 can reattach the PAVM to an available work process when the next request comes from the user session, or when the I/O request is completed.

As described above, native threads that are used to implement VM threads can be mapped to co-routines. In contrast, native threads that are only used internally in a VM, e.g., for garbage collection, can be replaced with synchronous function calls. Using synchronous function calls can be thought of as a way of simulating an internal native thread. Alternatively, if a function to be performed by an internal native thread is to be executed asynchronously, the function can be scheduled and performed on a designated low priority process within the server. Yet another alternative is to omit some functions altogether. For example, it may be possible to simply release all of the session memory upon the termination of a user session rather than perform garbage collection while the user session is active.

Figure 3:
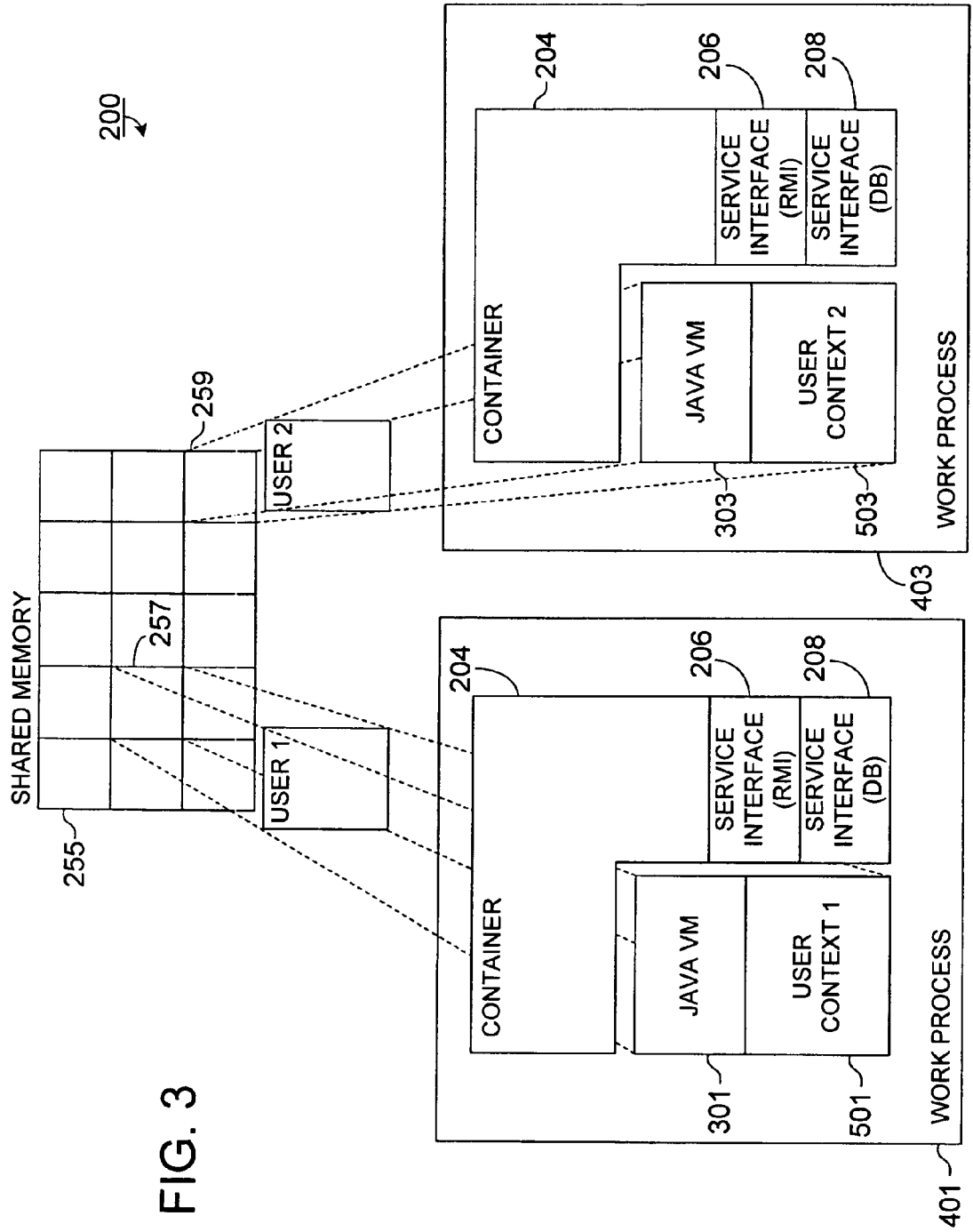
FIG. 3 is another block diagram of the server in FIG. 2.

FIG. 3 illustrates an example Java 2 Platform, Enterprise Edition (J2EE) application server 200 that includes a shared memory 255 and work processes 401, 403. J2EE is a Java platform designed for mainframe-scale computing that is typical of large enterprises. J2EE simplifies application development in a tiered, thin client environment by generating standardized, reusable modular components and enabling tiers to handle many aspects of programming automatically. J2EE includes many components of Java 2 Platform, Standard Edition (J2SE), such as a Java 2 Development Kit (JDK), support for Common Object Request Broker Architecture (CORBA), Java Database Connectivity 2.0 (JDBC), and a security model. J2EE also includes support for Enterprise Java Beans (EJB), a Java servlet application programming interface (API), and Java Server Pages (JSP).

Each work process 401, 403 can include a container 204 and service interfaces such as a Remote Method Invocation (RMI) interface 206 and a database management system (DB) interface 208. RMI is an object-oriented programming technique that enables objects on different computers to interact over a distributed network. RMI is the Java version of a protocol generally known as remote procedure call (RPC), but with the added ability to pass one or more objects along with a request.

The container 204 can include an OS interface that provides a more well-suited framework for a server architecture than the framework provided by the native OS. The OS interface can take over responsibility for certain functions from the native OS, such as scheduling, memory management, process architecture, clustering, load balancing, and networking. By taking over such functions, the container 204 can control use of critical resources such as processors and memory in a manner that optimizes certain objectives such as request throughput. The container 204 can also serve to hide the details of a server's native operating system from the applications executing on the server.

In addition, the container 204 serves as an interface through which a process-attachable VM can be attached to a process, executed in the process, and detached from the process. Thus, in the server implementation shown in FIG. 3, the container 204 provides some of the functionality for the use of process-attachable VMs, such as persisting and unpersisting the state of a VM (e.g., by mapping the shared memory block allocated to the VM into the address space of the process), and scheduling of the VM's threads or co-routines.

In the example in FIG. 3, a first user session (user session 1) is bound to the work process 401. User session 1 includes a corresponding user context 501 and VM 301. A block 257 of shared memory 255 is allocated for user session 1. The user context 501 and the state of VM 301 are stored in the shared memory block 257. In this example, a request corresponding to user session 1 has been received and dispatched to the work process 401. In order to process this request, the VM 301 corresponding to user session 1 is bound to the work process 401. Thus, both the user context 501 and the state of the VM 301 have been mapped from the shared memory block 257 into the address space of the work process 401. The VM 301 is then executed by the work process 401 in order to process the request. When the request has been processed, user session 1 can be unbound from the work process 401, meaning that the corresponding VM and user context can be detached from the work process 401 (e.g., by unmapping the user context 501 and the state of the VM 301 from the address space of the work process 401).

FIG. 3 also shows a user session 2 bound to the work process 403. User session 2 includes a corresponding user context 503 and VM 303. A block 259 of shared memory 255 is allocated for user session 2. The user context 503 and the state of VM 303 are stored in the shared memory block 259, and mapped into the address space of the work process 403. When the request from user session 2 has been processed, user session 2 can be unbound from the work process 403, meaning that the corresponding VM and user context can be detached from the work process 403 (e.g., by unmapping the user context 503 and the state of the VM 303 from the address space of the work process 403).

If a new request arrives from user session 1, the new request can be dispatched, for example, to work process 403, assuming that the VM 303 has been detached from the work process 403, either because the VM 303 is in a wait state or because the VM 303 has finished processing the request from user session 2. The VM 301 and the user context 501 corresponding to user session 1 can then be bound to the work process 403. In one implementation, this does not require the moving or copying of any data—rather, the shared memory block 257 (or the appropriate portion thereof) is simply mapped into the address space of the work process 403. The work process 403 can then execute the VM 301 to process the new request from user session 1.

Users sessions can thus be bound to and can move between different processes. In this manner, requests can be processed as soon as a work process is available. Moreover, mapping user sessions to different processes is typically a very inexpensive operation. As a result, request throughput is optimized. The use of process-attachable VMs also results in a scalable server, as request throughput can be further optimized by allocating more processes to the server. It is also possible to add more processors to the underlying computer in order to better handle the increased number of processes.

The use of process-attachable VMs also makes the server robust. This is due to the isolation that the OS provides between processes (e.g., the work processes in the server process pool 400). Moreover, it is also possible to protect the memory and states associated with user sessions by mapping only one user session's memory and VM into a work process at a time.

In an alternative implementation of the server 200, two or more PAVMs are attached to and executed within one process. For example, an ABAP VM and a Java VM can be executed in one process. Running an ABAP VM and a Java VM in one process enables the use of both ABAP and Java components in the same application. Applications can thus be developed to take advantage of useful components from both the ABAP and Java environments. The techniques described below can be used to execute multiple VMs within one process. For example, a process can be used to execute a Java VM, and ABAP VM, and a CLR VM.

The execution of multiple VMs within one process can be accomplished through the use of co-routines. In the example where an ABAP VM and a Java VM are to run within one process, two co-routines can be used—one for the ABAP VM and one for the Java VM. In addition to including either a Java VM or an ABAP VM, each co-routine can also include a container (or a portion of a container) in order to handle such functions as scheduling and communication between the two VMs as well as with applications outside the server.

Continuing with the ABAP/Java example, if the ABAP VM is the primary VM that an application will use, the co-routine that executes the ABAP VM can include a container as described above. The first time a request executing within the ABAP VM calls a Java object, the container can allocate memory for the Java VM stack (including the Java user stack), and start a new co-routine to execute the Java VM. The parameters that can be passed to the new co-routine include the location and size of the memory that is allocated, as well as a start function for the new co-routine (in this case, the Java VM itself). The Java VM can then start a main class, e.g., an implementation of a J2EE container that can be used to run J2EE components, such as Java servlets, Enterprise Java Beans, or Java Server Pages. While it is executing, the Java VM can invoke container functionality to, for example, read requests from and write responses to a message area. For scheduling, the Java VM can return control to the ABAP VM after it has written a response or a request. The Java VM can then be re-scheduled upon the arrival of either a new request or a response to its own request.

Figure 4:
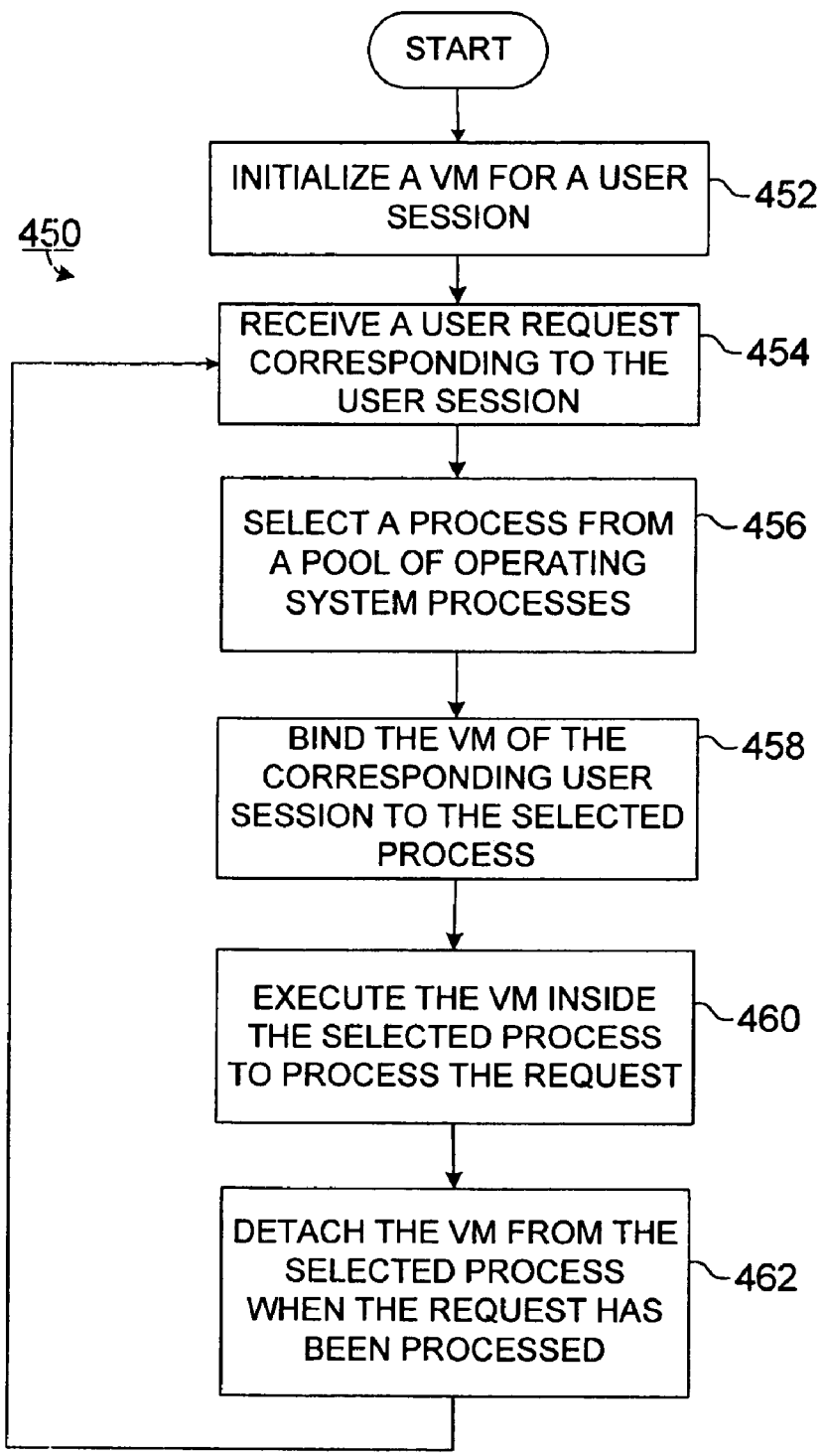
FIG. 4 is a process flowchart illustrating the processing of requests in the server of FIG. 2.

FIG. 4 is a flowchart illustrating a sample process 450 for processing requests in the server implementation shown in FIG. 2. The process 450 provides isolation between user sessions in a scalable manner through the use of process-attachable VMs. When a user session starts, a process-attachable VM is generated and initialized for that user session (452). This operation can include the allocation of a block of memory for the VM. The allocated memory can be shared memory (to enable the VM to be accessed by multiple processes in the server), though it can also be designated as private, meaning that that block of memory will belong solely to the newly created VM.

After a block of memory has been allocated to the VM, the VM can be stored in the memory block. The computational state of the VM (including the VM stack and heap), and the user context for the corresponding user session (including both the user stack and heap) can all be stored in the memory block. The user context can include handles to I/O resources such as files, and handles to proxies (e.g., resource managers) for I/O resources such as sockets.

Initializing a VM can be an expensive operation, as it may involve loading, verifying, and resolving several classes (e.g., Java system classes), as well as executing numerous static initializers in system classes. Such initialization overhead can be reduced through the use of a pre-initialized "master" VM. Rather than initializing a new VM from scratch, the memory block of the master VM can simply be copied into the memory block of the new VM. Copying the template image of the master VM's memory block into the memory block of a new VM enables the new VM to start running in an already-initialized state. If some initialization operations can only be performed when a new VM actually starts up, a template image of a partially initialized VM can be used, so that upon starting, the new VM only needs to perform those operations that are required to be performed at the actual time of start up.

Initialization (as well as execution) overhead can be further reduced through another optimization: storing type information (e.g., the runtime representation of loaded classes) in a section of shared memory that can be accessed by all VMs. This technique can reduce the overhead for class loading, verification, and resolution incurred by each VM, and can be especially useful if used to share the bytecode of system classes that are likely to be used by every user context. Similar techniques can be used to share the bytecode of user classes. Compiled code can also be shared in implementations where just-in-time (JIT) compilers are used.

After a VM has been initialized, the VM can be used to process user requests from the corresponding user session. When a user request from the corresponding user session is received (454), an available process from the pool of processes allocated to the server is selected to process the request (456). The PAVM of the user session that sent the request is then bound to the selected process (458).

If the memory block that is used to store the VM is shared memory that can be accessed by all the processes of the server, binding can essentially be a non-operation—e.g., the memory block, or a portion thereof, can simply be mapped into the address space of the selected process. The mapped portion can include the computational state of the VM. Alternatively, the VM can be unpersisted in a different manner. For example, the computational state of the VM can be copied from a file. The performance of such an operation can be bad, however, especially in comparison to the efficient operation of mapping shared memory into a process address space, which generally does not require copying or moving of data.

After the VM has been bound to the selected process, the VM can then be executed by the process in order to process the user request (460). This can involve the execution of two or more co-routines to simulate threads within the VM. It can also involve the execution of synchronous function calls to simulate the execution of internal threads (e.g., a thread for performing garbage collection). If such an internal thread or another function is performed asynchronously, one of the processes allocated to the server can be designated as a low priority process and used to perform the function for the VM. This technique can be used to perform garbage collection in a VM, for example. More important functions can be scheduled to run in either normal or high priority processes.

After the VM has processed the user request, the VM is detached from the selected process (462). The selected process can then be returned to the pool of available processes (or otherwise marked as being available) so that it can be used to process new requests received by the server. As with binding, detaching a VM from a process can be a simple, low cost operation: The VM's block of shared memory can simply be unmapped from the process address space. Alternatively, persisting the VM may involve a more complicated or expensive operation, such as saving the computational state of the VM to a file. Attaching or binding a VM to a process and detaching or unbinding the VM from the process can be mirror images of each other—i.e., the operation that was performed to unpersist the VM can be reversed in order to persist the VM. The server can then wait for another request from the user session (454).

When a user session terminates, its corresponding VM can also be terminated, and all of its resources, including its allocated memory, can be released. If a VM's memory is released at the end of a user session, it may be possible to omit garbage collection during the life of the VM. An alternative to terminating the VM at the end of a user session is to reuse the VM, i.e., to associate the VM with a different user session and to use the VM to process the requests corresponding to that user session. This technique can be especially useful for applications that require a very small user context (or even no user context) to be kept, as well as for applications that have very short user sessions. (Applications that do not require user contexts to be kept are sometimes referred to as stateless applications.) For all such applications, using a pool of serially reusable VMs can help to minimize the overhead associated with creating, initializing, maintaining, and terminating VMs.

Additional details about an implementation and use of process-attachable VMs can be found in N. Kuck, H. Kuck, E. Lott, C. Rohland, and O. Schmidt, *SAP VM Container: Using Process Attachable Virtual Machines to Provide Isolation and Scalability for Large Servers* (Aug. 1, 2002) (unpublished abstract submitted to and presented at the 2nd USENIX Java Virtual Machine Research and Technology Symposium (Java VM '02) as a Work-in-Progress Report).

Creating and Using Shared Objects

Allocating one VM for each user session means that each user session is provided with its own VM heap (e.g., a Java heap). Hence, data objects in a VM heap that would only exist once in an implementation of the server 200 that uses a single, multi-threaded VM are replicated once for each user session. This can lead to both resource consumption (e.g., memory for storing the replicated data objects) and time consumption (e.g., time for building and initializing the replicated data objects).

As a simple example, consider a large Java data structure that represents an Extensible Markup Language (XML) configuration file that is parsed at application startup time. In replicating such a data structure for each user session corresponding to the application, a server 200 wastes both CPU time (for parsing the XML file and constructing the data structure) and memory (for storing the data structure) for all but the first VM and user session.

To alleviate this problem, one implementation of the server 200 enables data objects to be shared between VMs. In this implementation of the server 200, a shared memory area or heap is used to store data objects that can be accessed by multiple VMs.

The data objects in a shared memory heap should generally not have any pointers or references into any private heap (e.g., the private heaps of the individual VMs). This is because if an object in the shared memory heap had a member variable with a reference to a private object in one particular VM, that reference would be invalid for all the other VMs that use that shared object. More formally, this restriction can be thought of as follows: For every shared object, the transitive closure of the objects referenced by the initial object should only contain shared objects at all times.

Accordingly, in one implementation of the server 200, objects are not put into the shared memory heap by themselves—rather, objects are put into the shared memory heap in groups known as "shared closures." A shared closure is an initial object plus the transitive closure of all the objects referenced by the initial object.

Figure 5:
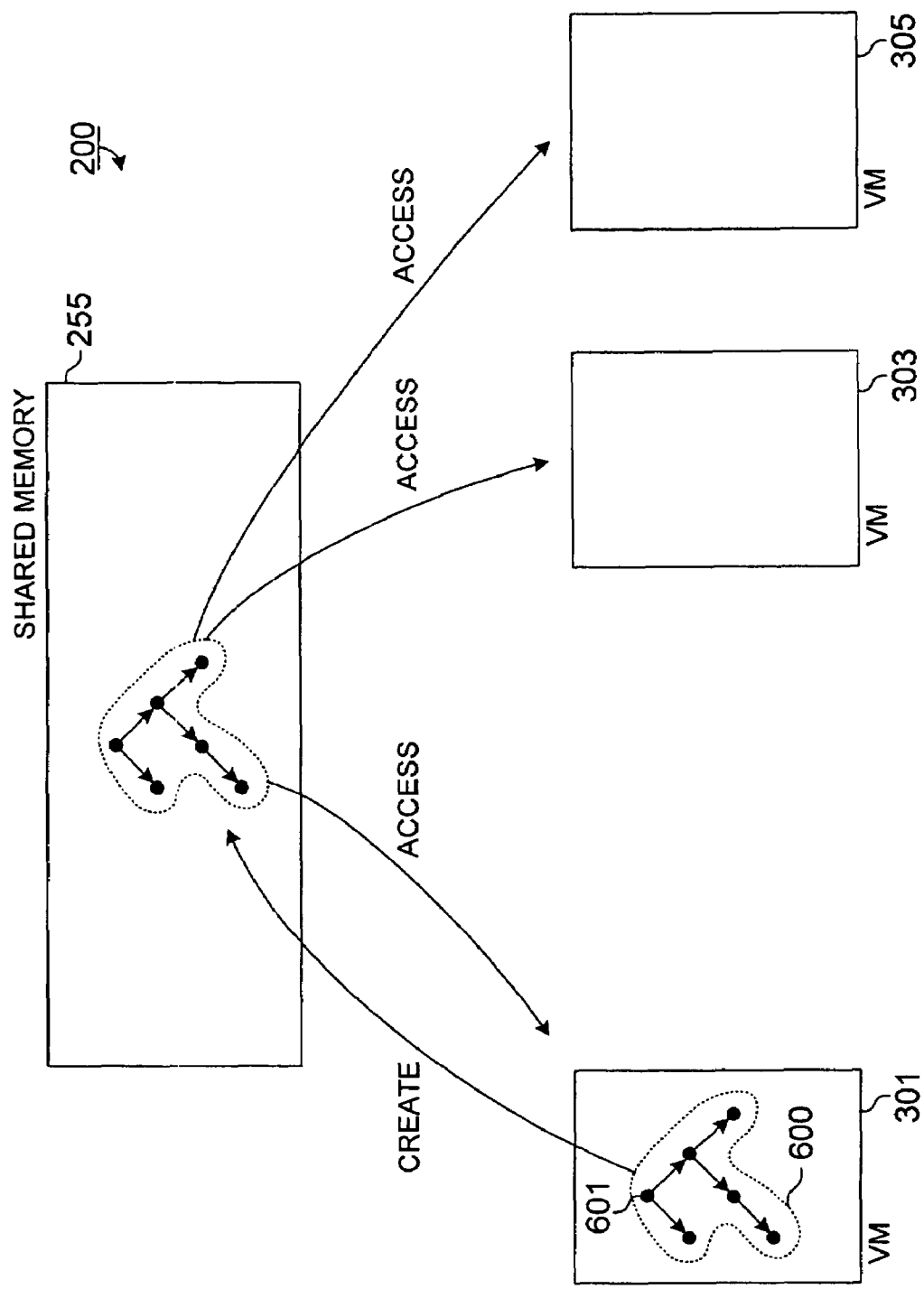
FIG. 5 is a block diagram illustrating the use of shared objects in a server.

The sharing of objects through shared closures is shown conceptually in FIG. 5, where a shared closure 600 has been identified in a first VM 301 by grouping a first object 601 with the transitive closure of all the objects referenced by the first object 601. After the shared closure 600 has been identified, the VM 301 can create the shared closure in a shared memory area 255, e.g., by copying the shared closure 600 into the shared memory area 255. After the shared closure 601 has been created in the shared memory area 255, it can be accessed by the VMs in the server (e.g., VMs 301, 303, and 305). A VM can access the shared closure 600 from the shared memory area 255 by, for example, mapping or copying the shared closure 600 from the shared memory area 255 into the address space of a process in which the VM is executing. The creation and use of shared closures is discussed in more detail below.

In order to be usable within a shared closure, an object must be "shareable." In general, a complex data structure (e.g., a heap or a portion thereof) in one runtime system (e.g., a Java VM) can be shared with a second runtime system if the data structure can be disassembled and then reassembled in the native format of the second runtime system without breaking the internal consistency or functionality of the data structure.

In one implementation of the server 200, objects are shared through the copying of shared closures to and from shared memory. For an object to be shareable in this implementation, the object must be able to withstand a transparent deep-copy into the address space of another VM without breaking the internal consistency or functionality of the object. The shareability requirements for such an implementation are discussed in more detail below.

Although most aspects of shareability are generally properties of the class of an object, the shareability of an object instance can depend not only on the properties of its class, but also on the types of the member variables of the object instance. Where the member variables can have runtime types that cannot be determined until runtime, the shareability of the object instances within a shared closure must be determined at runtime.

Thus, in a server implementation where object instances have runtime types, a distinction can be drawn between a shareable class and a shareable object instance. A class is a shareable class if it meets shareability criteria, examples of which are provided below. An object instance is a shareable object instance if its runtime type is a shareable class, and if all the objects that it references are shareable object instances. In other words, an object instance is a shareable object instance if both of the following conditions are met: (i) the object's runtime class is a shareable class, and (ii) all non-null reference type member variables of the object instance are shareable object instances.

The first condition (that the runtime class of an object is a shareable class) is meant to ensure that instances of a runtime class are semantically able to cope with sharing. Example criteria for determining whether a runtime class is shareable are provided below. While the determination of whether a runtime class is shareable only needs to be made once per class, such a characteristic is not inheritable, because a derived class might add functionality that is incompatible with sharing.

The second condition (that all non-null reference type member variables of an object instance are themselves shareable object instances) is meant to ensure that all the objects in a shared closure are shareable. Whether or not this condition is satisfied can be determined by recursive inspection of the references in an object instance. Due to the non-inheritability of the "shareable class" characteristic, simply inspecting the declared types of all member variables of an object is not sufficient, for although a declared type might be shareable, a runtime type might not be shareable.

Figure 6:
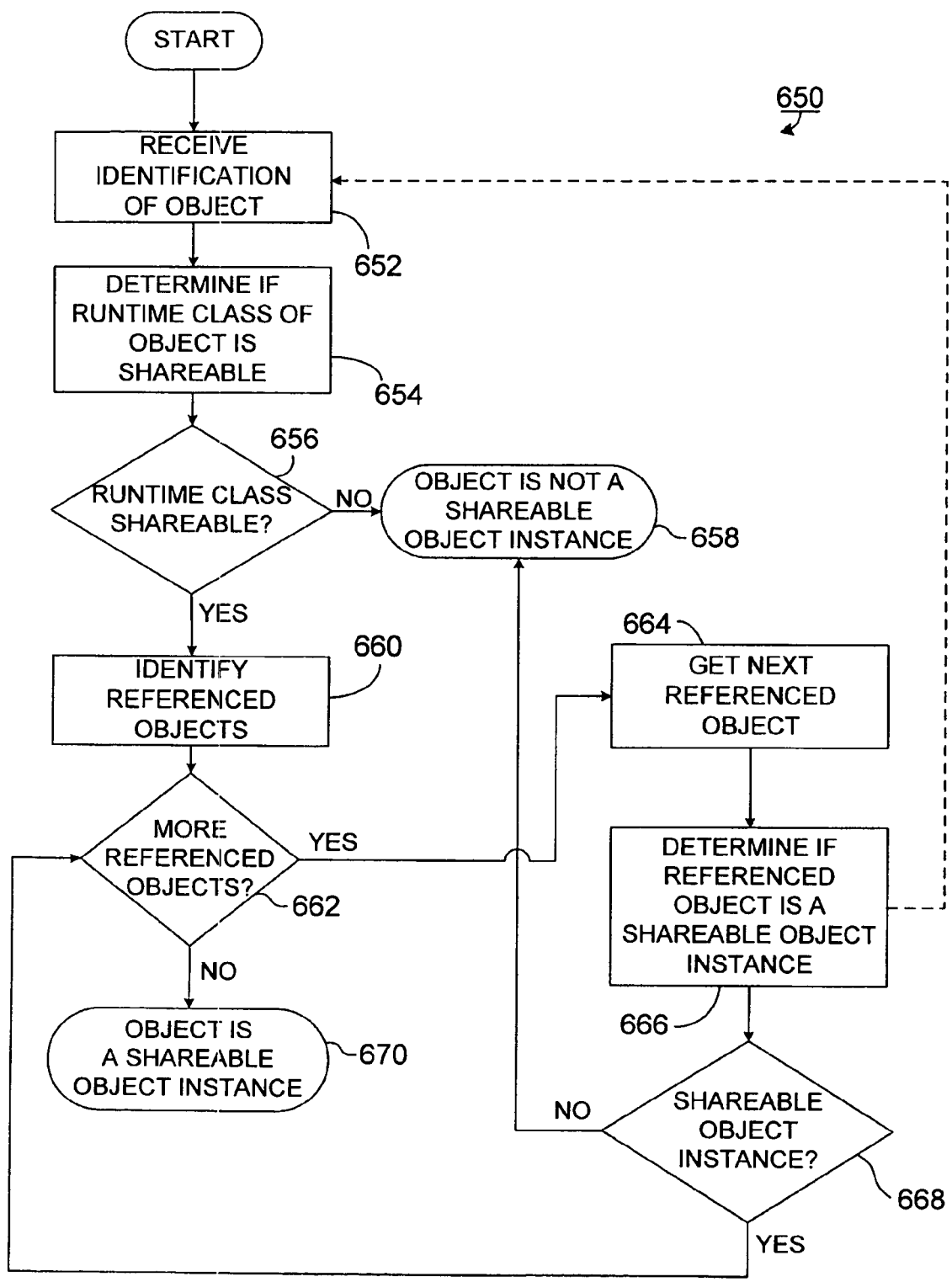
FIG. 6 is a flowchart illustrating a process for determining whether an object instance is shareable.

FIG. 6 illustrates a flowchart of a sample process 650 that can be used to determine whether an object instance is a shareable object instance. In the process shown in FIG. 6, an identification of an object instance is first received (652). The runtime class of the object instance is identified, and a determination is made whether the runtime class is a shareable class (654). If the runtime class is not a shareable class ("no" branch of decision 656), the process ends with an indication that the object instance is not shareable (658). Such a negative indication can be made, for example, by raising a "not shareable" exception.

If the runtime class of the object instance is a shareable class ("yes" branch of decision 656), the objects that are referenced by the object instance are identified (660). The process 650 then traverses through the referenced objects to determine whether the referenced objects are shareable object instances. If there are more referenced objects ("yes" branch of decision 662), one of the remaining referenced objects is selected (664). A determination is then made whether the referenced object is a shareable object instance (666). If the referenced object is not a shareable object instance ("no" branch of decision 668), the process 650 ends with an indication that the initial object instance is not shareable (658). This is because one of the objects referenced by the initial object instance is not a shareable object instance, and as stated previously, for an object to be shareable, all of the objects referenced by the initial object must be shareable object instances.

If the referenced object is a shareable object instance ("yes" branch of decision 668), the process 650 checks to see if there are more referenced objects to be analyzed. If there are more referenced objects ("yes" branch of decision 662), the process 650 selects one of the remaining referenced objects and proceeds as before. If there are no more referenced objects ("no" branch of decision 662) and the process has not yet terminated, that means that all of the referenced objects have been analyzed and determined to be shareable object instances. Consequently, the process ends with an indication that the initial object instance is shareable (670).

The determination of whether a referenced object is a shareable object instance can be made recursively—i.e., the process 650 can be invoked again with the referenced object, as shown by the dashed line in FIG. 6. Stated differently, the referenced objects can be traversed recursively, so that a determination can be made with respect to each object in the transitive closure of the referenced objects.

If the initial object and all the objects in the transitive closure of the referenced objects are shareable object instances, the objects can be grouped into a shared closure and shared with another runtime system (e.g., by copying the shared closure to a shared memory area).

The process 650 can be thought of as ultimately determining whether the runtime class of each object in a shared closure is a shareable class. As explained previously, in an implementation in which objects are shared through the copying of shared closures to and from shared memory, an object is generally deemed to be shareable if the object can withstand a transparent deep-copy into the address space of another VM without breaking the internal consistency or functionality of the object. In such an implementation, a class can generally be deemed to be shareable if a VM does not execute any custom code in serializing or deserializing an object instance of the class. The rationale for this rule is that if a VM does not need to execute any custom serialization or deserialization code, the deep-copy operation that is used to copy a shared closure into a shared heap (or from the shared heap into the address space of a VM) is semantically equivalent to the serialization and deserialization of the objects in the shared closure. Hence, if a shared closure has been copied into a shared heap, any VM that maps or copies the shared closure into its own address space should be able to access the objects in the shared closure without any additional actions necessary to deserialize the objects.

Figure 7:
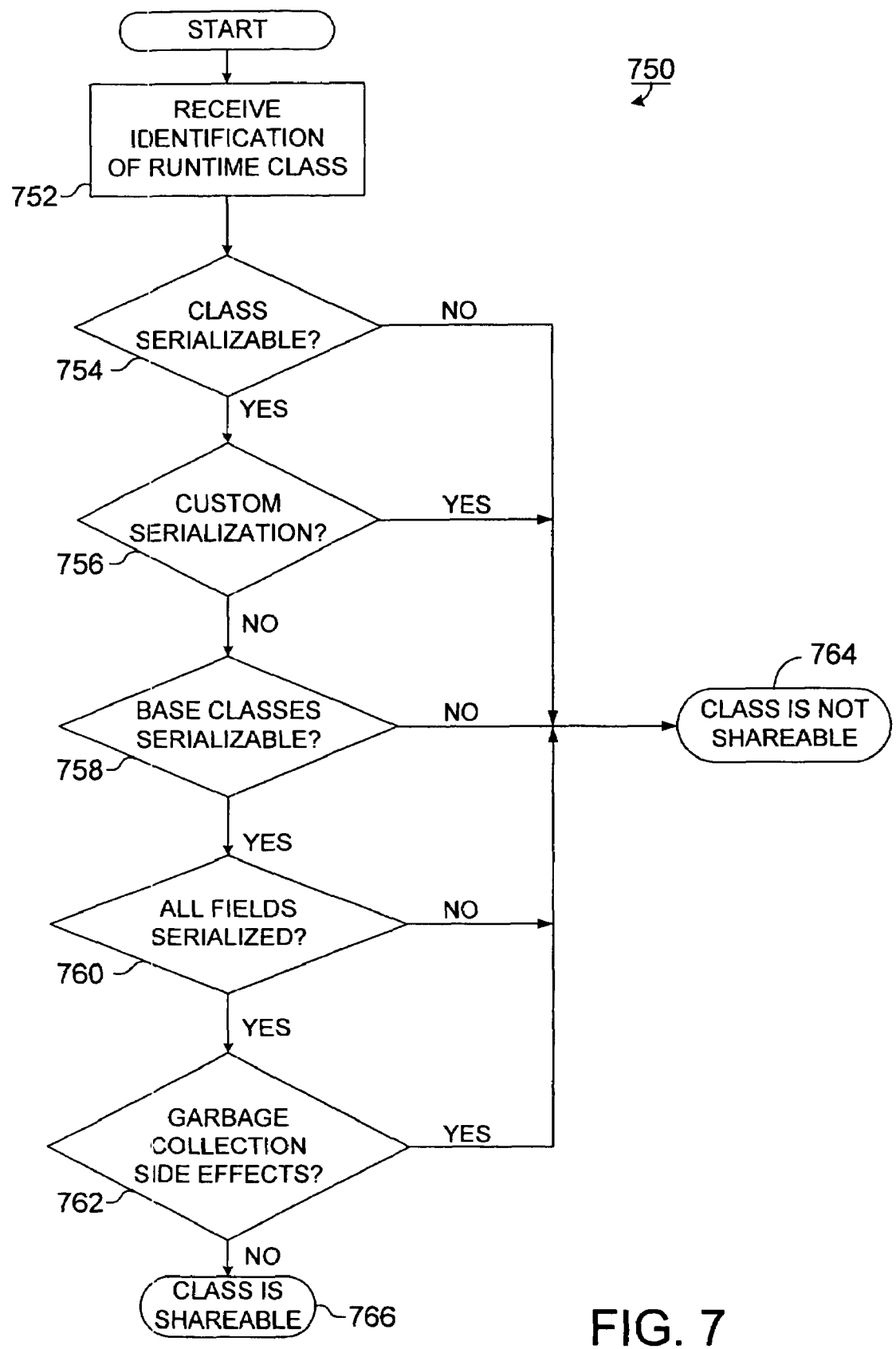
FIG. 7 is a flowchart illustrating a process for determining whether a class is shareable.

FIG. 7 illustrates a flowchart of a sample process 750 that can be used to determine whether a particular class is a shareable class. The process 750 can be used, for example, where the process 650 calls for a determination to be made as to the shareability of a particular runtime class (654). In the process shown in FIG. 7, an identification of a class (e.g., the runtime class of an object instance) is first received (752). A number of criteria are then applied to determine whether the class is shareable. Specifically, the class must satisfy all of the following conditions for the class to be shareable.

First, the class must be serializable (754). In the case of a Java class, this can be determined by checking whether the class implements the marker interface java.io.Serializable. The implementation of the java.io.Serializable interface denotes that an object instance of the class can generally be copied into another address space in a meaningful way. Hence, if a class does implement the java.io.Serializable interface, the first condition is satisfied.

Second, the class must not include any custom serialization or deserialization code (756). In the case of a Java class, this can be determined by checking whether the class implements any of the following methods:

```
private void readObject (ObjectInputStream);
private void writeObject (ObjectOutputStream);
public void readExternal (ObjectInput);
public void writeExternal (ObjectOutput);
{any access} Object readResolve( );
{any access} Object writeReplace( );
```

The above methods constitute custom code that is executed during serialization or deserialization. Such custom code cannot automatically be proven to be equivalent to the deep-copy operation that is performed during the creation of a shared closure. Hence, where a deep-copy operation is used to create shared closures, the implementation of any of the above functions precludes a class from automatically being deemed a shareable class in the process 750.

Third, all the base classes of the class at issue must be serializable (758). In the case of a Java class, this can be determined by checking whether all the base classes implement java.io.Serializable or have a trivial default constructor—if so, the third condition is satisfied. If any base class does not implement java.io.Serializable, its default constructor is executed during deserialization. If the default constructor is trivial—i.e., if the constructor is either empty or invokes a trivial default constructor of a base class, which can be determined through recursive examination of the default constructors—the invocation of the default constructor does not have any effect on deserialization. A non-trivial default constructor precludes a class from automatically being deemed a shareable class in the process 750 because the default constructor may include custom code that is not the equivalent of a deep-copy operation.

Fourth, all the member fields of the class at issue must be serialized (760). In the case of a Java class, this can be determined by checking whether the class has any transient fields or serialPersistentFields fields. Transient fields are fields that are set to their default values during deserialization. Hence, deserializing an object instance of a class with transient fields may not be equivalent to a deep-copy of the object instance. Consequently, the existence of transient fields in a class precludes the class from automatically being deemed a shareable class in the process 750. Classes having serialPersistentFields fields are also excluded because such classes are simply another manner of indicating classes with transient fields.

Fifth, the class must not have any garbage collection side effects (762). Objects that are shared may have different lifecycles than the lifecycles of VMs that use them, and hence may affect garbage collection algorithms executing within the VMs. A garbage collection side effect precludes a class from automatically being deemed a shareable class in the process 750 because the side effect may interfere with proper operation of a garbage collection algorithm. In the case of a Java class, the process 750 can determine that this condition is satisfied by checking that the class has a trivial finalizer and that the class is not derived from the class java.lang.ref.Reference. A trivial finalizer is a finalizer that is either empty or that invokes a trivial finalizer of a base class.

If all five of the above conditions are satisfied, the process 750 ends with an indication that the class at issue is a shareable class (766). If any of the conditions is not satisfied, on the other hand, the process 750 ends with an indication that the class at issue is not a shareable class (764).

In one implementation of the server 200, a class is deemed to be shareable if the class is found to be shareable through a process that is applied automatically (e.g., the process 750), or if the class has been previously declared to be shareable. That is, a class may be shareable even if an automatically applied analysis of the class fails to indicate that the class is shareable.

A class can be declared to be shareable if the class has been inspected (e.g., through a manual review of its source code) and found to be suitable for sharing. For example, in an implementation in which objects are shared through the copying of shared closures to and from shared memory, a class can be suitable for sharing if semantic inspection proves that all violations of the shareability criteria specified above are harmless. Violations of the shareability criteria are generally harmless if, despite those violations, the deep-copy operation that is used to copy a shared closure into a shared heap (or from the shared heap into the address space of a VM) can be shown to be semantically equivalent to serialization and deserialization of the objects in the shared closure.

One simple example of a class that does not satisfy the shareability criteria specified above but that is nevertheless suitable for sharing is the class java.lang.String (as that class is defined in the Java 2 Platform, Standard Edition 1.3). The java.lang.String class violates the fourth condition specified above because it includes a serialPersistentFields field. Manual inspection of the code in the class shows that that field is included in order to implement special handling of object instances of the class during serialization, which is a requirement of the serialization protocol. Nevertheless, it can easily be shown that the effects of a deep-copy are equivalent to serialization for the class. Consequently, the java.lang.String class can be declared to be shareable.

A more complex example of a class that does not satisfy the shareability criteria above but that is nevertheless suitable for sharing is the class java.util.Hashtable (as that class is defined in the Java 2 Platform, Standard Edition 1.3). The java.util-.Hashtable class violates the second and fourth conditions specified above because it contains custom serialization methods and transient fields. A review of the code in the class shows that the custom serialization methods and the transient fields are required because hashcodes are not preserved during serialization, which forces hash tables to rebuild their content during deserialization. Since the deep-copy operation preserves hashcodes, however, the deep-copy operation can be shown to be equivalent to serialization and deserialization. As a result, the class java.util.Hashtable can also be declared to be shareable.

Figure 8:
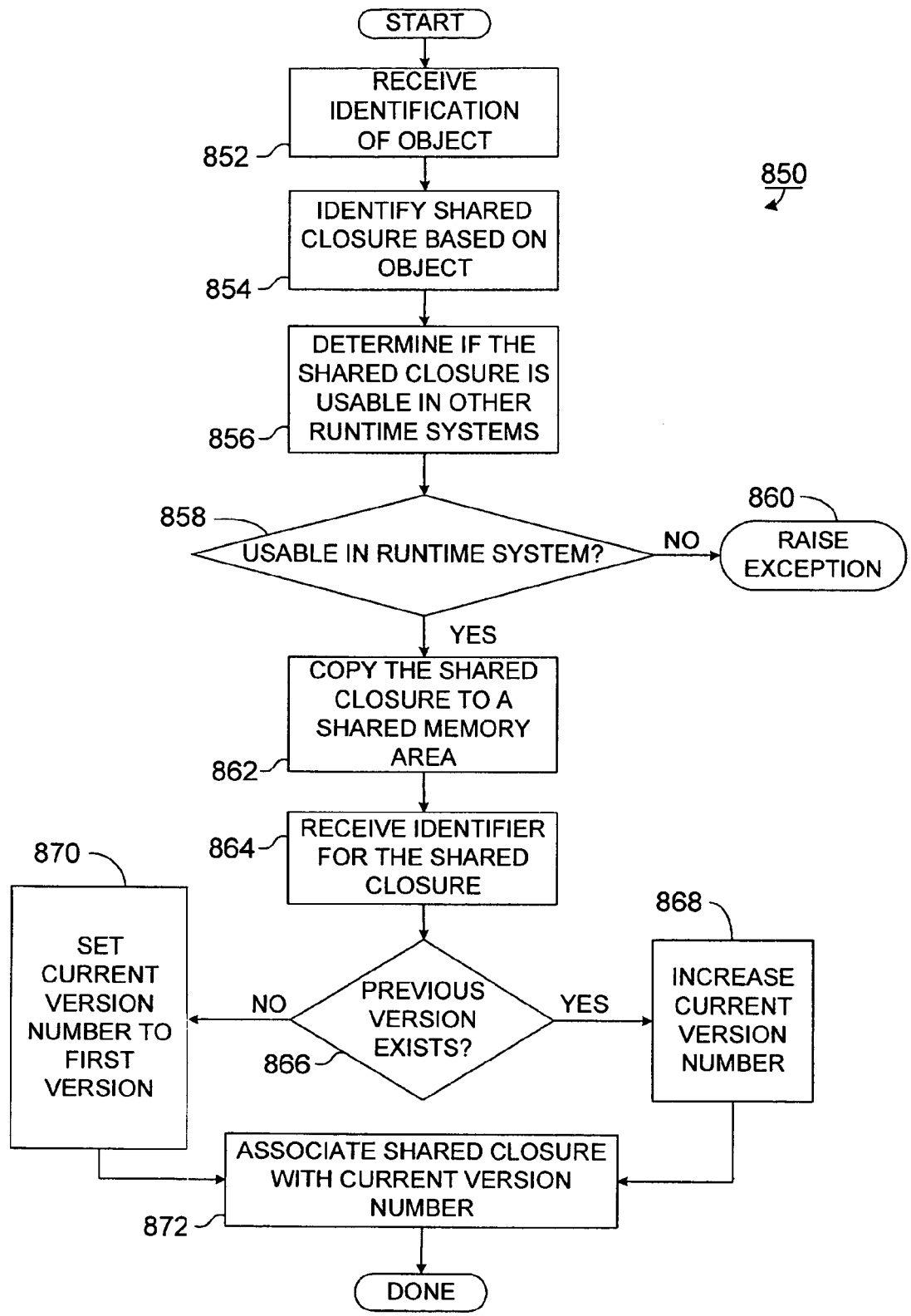
FIGS. 8 and 9 are flowcharts illustrating processes for creating and using shared objects.
Figure 9:
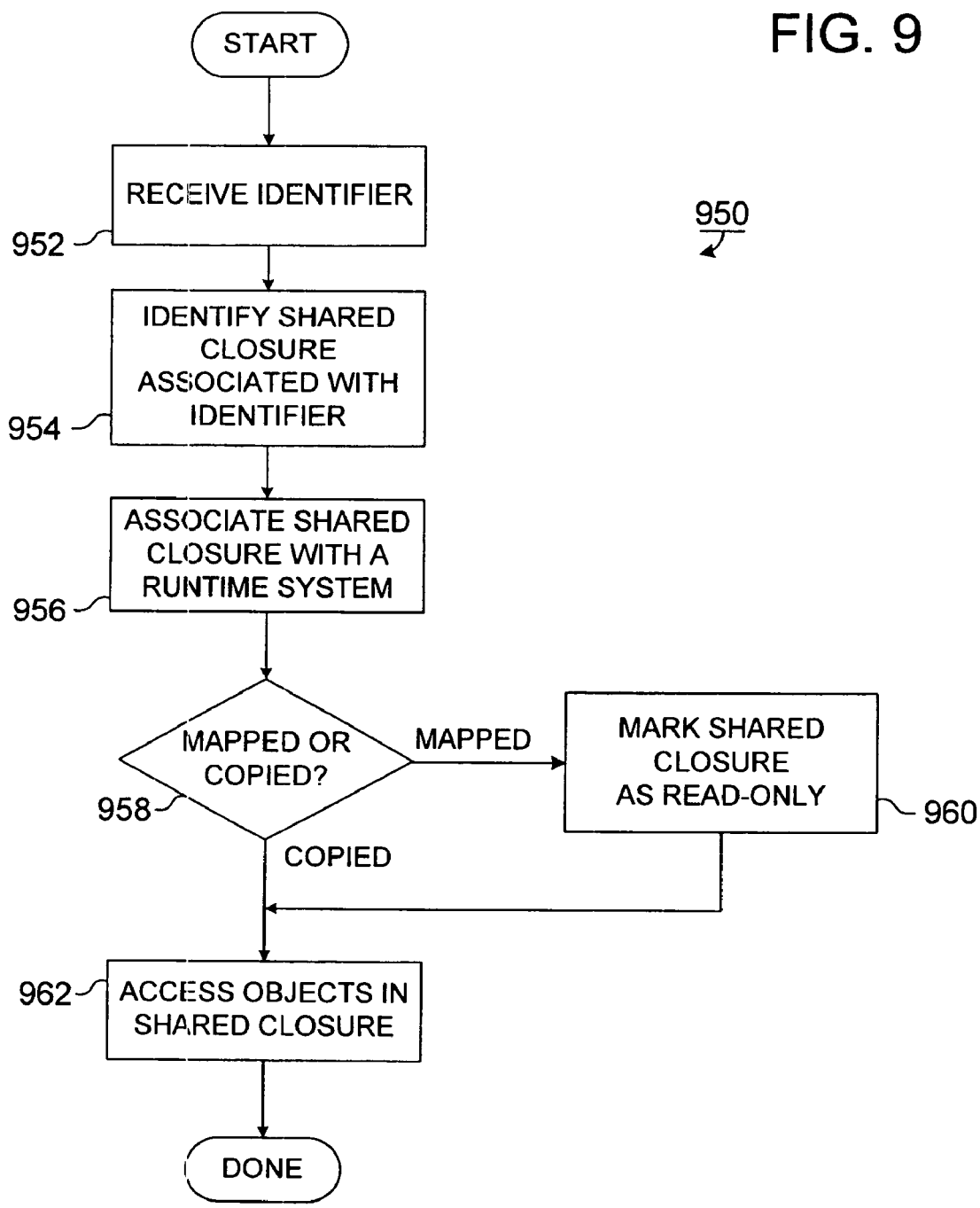

The creation and use of shared closures, which is shown conceptually in FIG. 5, can be realized by the sample processes 850 and 950 illustrated in FIGS. 8 and 9.

The process 850 depicts an example process that can be used to create a shared closure. In the process 850, an identification of an initial object in a first runtime system (e.g., a VM) is received (852). A shared closure—i.e., the initial object plus the transitive closure of all the objects that are referenced by the initial object—is then identified (854), and a determination is made regarding whether the shared closure can be used in or shared by another runtime system (e.g., another VM) (856). This determination can be made, for example, by determining whether the objects in the shared closure are shareable (or more precisely, by determining whether each object instance in the shared closure is a shareable object instance). In one implementation, the operations to identify a shared closure and determine whether the objects in the shared closure are shareable object instances (854, 856) are implemented by the process 650 shown in FIG. 6.

If the shared closure is not usable in another runtime system ("no" branch of decision 858), the process 850 raises an exception or generates some type of negative indication. For example, if the objects in the shared closure are not all shareable object instances, the process can raise an exception to indicate that the initial object and its shared closure are not shareable.

If the shared closure is usable in other runtime systems ("yes" branch of decision 858), the process 850 invokes a mechanism to make the shared closure available to the other runtime systems. For example, if objects are shared through the use of shared memory, the shared closure can be copied to a shared memory area (862). In other implementations, the shared closure can be transmitted to one or more runtime systems (e.g., other VMs) through the use of messages or other means of communication.

The process of creating a shared closure can also involve associating a specified name or other identifier with the shared closure (864). Such an identifier can subsequently be used by other runtime systems to identify the shared closure to be accessed.

In some implementations, the process of creating a shared closure also involves the use of versioning. In the process 850, versioning is accomplished through the use of version numbers that are associated with the shared closures stored in shared memory. When a shared closure is created with a given name, a determination is made regarding whether a shared closure with that name already exists in shared memory. If such a shared closure does exit ("yes" branch of decision 866), the current version number associated with the shared closure is increased (868), and the new current version number is associated with the newly created shared closure (872). If there is no shared closure with the given name in shared memory ("no" branch of decision 866), the current version number for the new shared closure is set to a number that indicates a first version (e.g., 0 or 1) (870), and associated with the newly created shared closure (872).

Versioning can be used to update shared closures—e.g., a new, updated version of a shared closure can be created under the same name previously given to the shared closure. In one implementation, when a new version of a named shared closure is created, all subsequent operations to associate the named shared closure with a VM use the new version of the shared closure. VMs that are already accessing the shared closure (e.g., VMs that have a previous version of the shared closure mapped into their address space) are not affected by the new version—they simply keep all object references to the old version. In this implementation, multiple versions of a shared closure can coexist in shared memory until the obsolete versions are no longer referenced by any VM and thus can be garbage collected.

FIG. 9 illustrates a flowchart of a sample process for accessing and using a shared closure. In the process 950, a name or other identifier is received (952) and used to identify an associated shared closure (954). The name or other identifier corresponds to the identifier that was associated with the shared closure when the shared closure was created (e.g., in the operation 864 in the process 850). Where versioning is implemented, if more than one version of a specified shared closure exists, the most recently created version of the specified shared closure is identified.

The identified shared closure is then associated with a runtime system (e.g., a VM) (956). In one implementation, a shared closure can be associated with a runtime system in one of two ways—either by mapping the shared closure from a shared memory area into the address space of the runtime system, or by copying the shared closure from the shared memory area into the address space of the runtime system. After the shared closure has been associated with the runtime system, the objects within the shared closure can be accessed using normal operations (e.g., normal Java operations) (962).

In some implementations, access to the objects in a shared closure may depend on how the shared closure is associated with the runtime system. For example, in one implementation, if a shared closure is mapped into the address space of a VM ("mapped" branch of decision 958), access to the objects in the shared closure is restricted to read-only access (960). Because of this restriction, any attempt to write to a member variable of an object instance in the shared closure will result in an error. This restriction can be useful to prevent VMs from "breaking" shared object instances by, for example, overwriting a reference member variable in a shared object instance with a reference into a VM's private heap, or otherwise breaking the internal consistency or functionality of the shared objects.

If, on the other hand, a shared closure is copied into the address space of a VM ("copied" branch of decision 958), the VM is granted full read-write access to the copied objects. In such an implementation, the objects in a shared closure can thus be updated by copying the shared closure into the address space of a VM, modifying the content of the objects in the shared closure, and then creating a new version of the shared closure in shared memory (e.g., using the process 850 shown in FIG. 8).

Other approaches can be used to associate a shared closure with a runtime system and to provide access to the objects in the shared closure from the runtime system. For example, a copy-on-demand approach can be used. In one such implementation, a shared closure is mapped into the address space of a VM without restricting access to the shared closure to read-only access. Instead, access to the shared closure is monitored, and, upon detecting the first attempted write access to the shared closure, the shared closure is copied into the address space of the VM, thereby transforming the shared closure from a mapped shared closure into a copied shared closure. The attempted write access is then allowed to complete, and subsequent read and write accesses to the copied shared closure can proceed as they would normally. If the heap address of a shared closure changes when the transformation from a mapped shared closure to a copied shared closure occurs, existing references to the heap have to be redirected to the newly created copy of the shared closure. Alternatively, underlying OS features can be used to map a shared closure in a manner that allows the OS to provide copy-on-demand functionality without heap address changes.

In addition to functions for creating, mapping, and copying shared closures, an Application Programming Interface (API) can include additional functions for managing shared objects. For example, an API can also include a "delete" function. One implementation of a "delete" function takes a name or other identifier as an input parameter, and marks the associated shared closure in shared memory as being deleted. Marking a shared closure as deleted does not affect VMs that are already accessing the shared closure, but VMs that subsequently try to access the shared closure (e.g., by mapping or copying the shared closure into their address spaces) are precluded from doing so.

In an implementation of the server 200 in which shared closures can be mapped into the address spaces of VMs, garbage collection for deleted or obsolete versions of shared closures can be performed by keeping track of the number of VMs that have a shared closure mapped into their address space. A count can be incremented each time a VM maps a shared closure into its address space. The count can be decremented when, in the course of its own garbage collection, a VM determines that it no longer includes any references into the previously mapped shared closure. When the count associated with a particular shared closure reaches zero, that shared closure can be deleted from shared memory.

In Java, an object instance typically includes a reference to a runtime representation of the class of the object instance, and the class runtime representation in turn contains a reference to a class loader for the class. Consequently, the runtime representation and the class loader associated with a Java object instance are included in the shared closure of the object instance, which means that the runtime representation and the class loader must themselves be shareable in order for the object instance to be shareable. Thus, in a server implementation that includes class runtime representations and class loaders, two additional criteria can be used to determine whether a particular class is shareable: The class should have a shareable runtime representation and a shareable class loader.

Various techniques can be used to deal with class runtime representations and class loaders (i.e., to make class runtime representations and class loaders "shareable"). One technique involves actually sharing class runtime representations and class loaders. That is, when an object instance is copied to shared memory, the runtime representation and class loader corresponding to the class of the object instance are also copied to shared memory, so that they can be accessed by all VMs (e.g., through a mapping operation). Various optimizations of this technique are possible. For example, before copying the runtime representation of a class into shared memory, the shared memory can be checked to determine if a runtime representation for that class already exists in the shared memory—if so, the reference to the runtime representation in the object instance being copied into shared memory can simply be set to refer to the runtime representation that already exists in shared memory.

A second technique for handling runtime representations and class loaders is not to share them, but to make sure that they are located at fixed locations in each VM. In other words, the runtime representation and class loader for each class must be located at the same, fixed address in each VM. The reference to the runtime representation in each object instance can then be set to the location that corresponds to the runtime representation for the class of the object instance. With this approach, references to runtime representations are valid regardless of whether object instances are mapped from shared memory or copied into address spaces.

Fixing the location of the runtime representation for each class may not be practical, however. Hence, a third technique for handling runtime representations and class loaders is to adjust the references to runtime representations for each object instance when the object instance is copied into a VM. As with the prior technique, runtime representations and class loaders are not shared in this technique—i.e., each VM stores its own runtime representation and class loader for each class. However, unlike the prior technique, this technique does not require the location of each runtime representation and class loader to be fixed in each VM. Instead, the locations of runtime representations and class loaders can be different in each VM. When an object instance is copied into a particular VM, the location of the appropriate class runtime representation is determined, and the corresponding reference in the object instance is set to that location.

The third technique for dealing with runtime representations—adjusting references to the runtime representations in each VM—precludes object instances from being mapped into multiple VMs simultaneously. This is because as indicated earlier, object instances that are shared cannot have references into any private heaps. Since the third technique adjusts references to refer to private runtime representations in each VM, the technique can only be used when objects are copied into the address spaces of VMs, or in other circumstances where objects are only accessed by one VM at a time (e.g., in an implementation where object instances can be mapped "exclusively," so that when an object instance is mapped into one VM, no other VMs can map that object instance).

The third technique discussed above may be useful in a cluster architecture, where VMs can be executing on multiple physical machines. Runtime representations are generally not shared across physical machines, so references to runtime representations must be adjusted when an object instance is shared across physical machines (e.g., when an object instance that is being used in a VM on one physical machine is transmitted to a second physical machine to be used in a VM on that machine).

Figure 10:
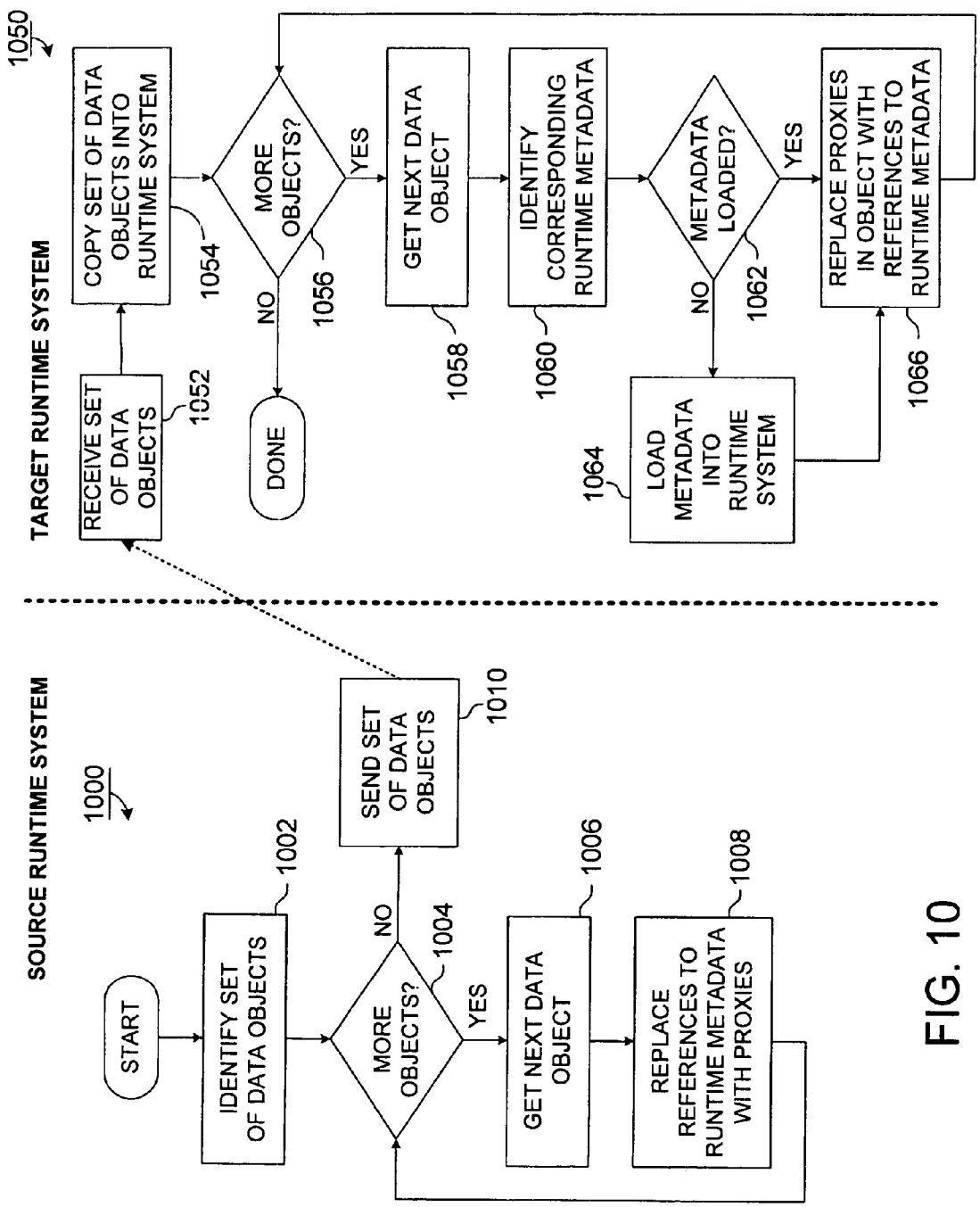
FIG. 10 is a flowchart illustrating processes for sharing objects across multiple machines.

FIG. 10 illustrates a technique for using objects across multiple machines. The technique, which is a generalized version of the third technique for dealing with runtime representations discussed above, includes a combination of some operations that can be performed in a source runtime system and some operations that can be performed in a target runtime system. The process 1000 in FIG. 10 illustrates an example of the operations that can be performed in the source runtime system, and the process 1050 illustrates an example of the operations that can be performed in the target runtime system. In general, the technique involves the generation and use of stubs on the fly—references to runtime metadata are replaced with proxies in the source runtime system, and the proxies are in turn replaced with references to runtime metadata in the target runtime system.

More specifically, in the process 1000, a set of objects to be shared with or used in a target runtime system is first identified (1002) in a source runtime system. This operation can involve, for example, identification of a shared closure of objects in the source runtime system and verification that all the objects in the shared closure are shareable object instances, as per the process 650 in FIG. 6. However, this operation can also be very simple—for example, a single object can be selected to be used in the target runtime system. (If a single object is selected, however, any references in the selected object to one or more referenced objects in the source runtime system would not be valid in the target runtime system unless special arrangements are made, for example, by locating the referenced objects at the same address in both runtime systems, or by adjusting the references in the selected object, as described above.)

The objects in the identified set of objects are then traversed. If there are more objects in the set of objects ("yes" branch of decision 1004), the next object is retrieved (1006), and any references in the object to runtime metadata (e.g., a reference to a runtime representation of the class of the object) are replaced with proxies (1008). After all the objects have been traversed ("no" branch of decision 1004), the set of objects is sent to the target runtime system (1010). The operations in the process 1000 can of course be performed in different sequences—for example, proxies can be placed in objects, and the objects can be sent to the target runtime system, before an entire set of objects has been identified. Such operations can for instance be performed on the fly as part of the recursive process of identifying a shared closure.

The process 1050 illustrates a corresponding process that can be used in a target runtime system (e.g., in a target VM executing on a different machine than the source VM). A set of data objects is received (1052), and copied in the target runtime system (1054). The objects in the received set of objects are then traversed. If there are more objects in the received set of objects ("yes" branch of decision 1056), the next object is retrieved (1058). The relevant runtime information that corresponds to the object is then identified (1060). Such information can include, for example, the runtime class of the object. The proxies in the object can then be replaced with references to runtime metadata in the target runtime system based on the runtime information (1066). For example, once the runtime class of an object has been identified, a proxy for a runtime representation in the object can be replaced with a reference to the runtime representation of that class in the target runtime system.

In some circumstances, before one or more proxies in the object are replaced with references to runtime metadata in the target runtime system, a check is first made to determine whether such metadata has been loaded into the target runtime system. If the metadata has not been loaded in the target runtime system ("no" branch of decision 1062), the metadata can be loaded as needed (1064). As an example, a class loader can be invoked to load the runtime representation of a class into a VM before a proxy is replaced with a reference to that runtime representation.

As with the process 1000, the operations in the process 1050 can be performed in different sequences—for example, proxies can be replaced with references to runtime metadata as objects are received (i.e., before an entire set of objects has been received). Further variations are also possible. For example, proxies can be replaced with references to runtime metadata either when objects are received, or on an "on demand" basis (e.g., when the objects are first accessed in the target runtime system).

The techniques discussed above, including the creation and use of shared closures and the handling of references to runtime metadata, are a particular implementation of the general concept of disassembling a complex data structure in one runtime system and reassembling the data structure in the native format of another runtime system. The techniques can be used, for example, to share objects in a server environment, where the complex data structures are heaps (or portions thereof, such as a set of objects within a heap), and the runtime systems are VMs. Examples of such uses of the above techniques are provided in more detail below.

Figure 11:
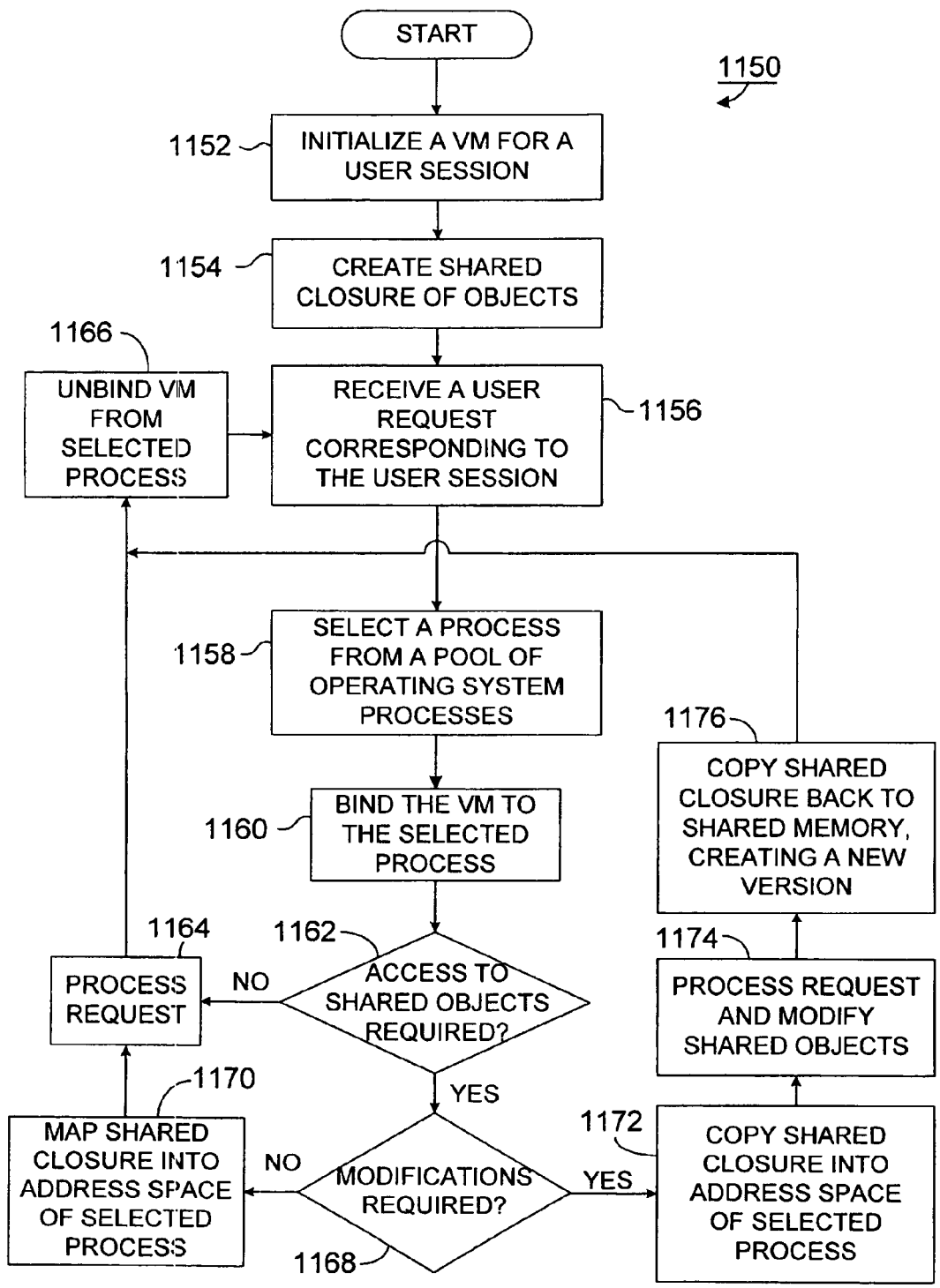
FIG. 11 is a flowchart illustrating a process for using shared objects in a server.

FIG. 11 is a flowchart of a sample process 1150 for using shared objects in a server. The process 1150 illustrates how shared objects can be used in conjunction with process-attachable VMs. In the process 1150, a VM is created for a user session (1152), and a shared closure of objects is created and stored in shared memory (1154). When the server receives a user request corresponding to the user session (1156), it selects an available process from a pool of processes allocated to the server (1158), and binds the VM that was created for that user session to the selected process (1160).

If the VM does not need to access the objects in the shared closure ("no" branch of decision 1162), the VM can simply process the request (1164), after which the VM can be unbound from the process (1166). The process can then be returned to the pool of available processes, and the server can again bind a VM to the process when it receives a new request (1156).

On the other hand, if the VM does need to access the objects in the shared closure ("yes" branch of decision 1162), the shared closure is associated with the VM. The shared closure can be associated with the VM in various ways—for example, the shared closure can be bound to the selected process by either mapping or copying the shared closure into the address space of the selected process.

The exact manner in which the shared closure is associated with the VM depends on the type of access needed by the VM. As indicated above, in one server implementation, mapped shared closures are always restricted to read-only access, so as to prevent a mapping VM from breaking a shared object instance in the shared closure by setting a member variable to a value that is not valid in other VMs. In such an implementation, if the VM associated with the user session in the process 1150 only needs read access to the objects (i.e., if the VM does not need to modify any of the objects in the shared closure, as indicated by the "no" branch of decision 1168), the shared objects can be mapped into the address space of the selected process (1170). The VM can then process the request (1164), reading information from the shared objects as necessary.

If the VM needs read-write access to the shared objects (i.e., if the VM needs to modify one or more of the objects, as indicated by the "yes" branch of decision 1168), the shared closure is copied into the address space of the selected process (1172). The VM then has full read-write access to the shared objects, and it can process the request and modify the objects as necessary (1174). When the VM is finished modifying the shared objects, it can copy the shared closure back to shared memory (1176). As indicated previously, in one server implementation, a shared closure can be copied to shared memory by re-creating the shared closure (e.g., by invoking a "create" function, assigning the same previously used name to the shared closure, and creating a new version of the shared closure if an old version of the shared closure with that name still exists in shared memory). As before, after the request has been processed, the VM can be unbound from the process (1166), the process can be returned to the pool of available processes, and the server can again wait to receive new requests (1156).

The objects in the shared closure can include any type of object, including objects that store user context information, as discussed in the examples below. Moreover, although the process 1150 only shows one VM accessing the shared closure, the shared closure can also be accessed by other VMs (for example, other VMs can map or copy the shared closure and thereby access the objects in the shared closure).

Shared Virtual Machines

The server implementations illustrated in FIGS. 2 and 3 are well-suited to environments where user sessions correspond to large user contexts. However, such implementations may not be optimal in environments where user contexts are fairly small (e.g., less than 10 kilobytes each). Even with the ability to share objects between VMs, allocating a separate VM for each user session in such an environment may not be practical, as it results in significant overhead per user session.

Figure 12:
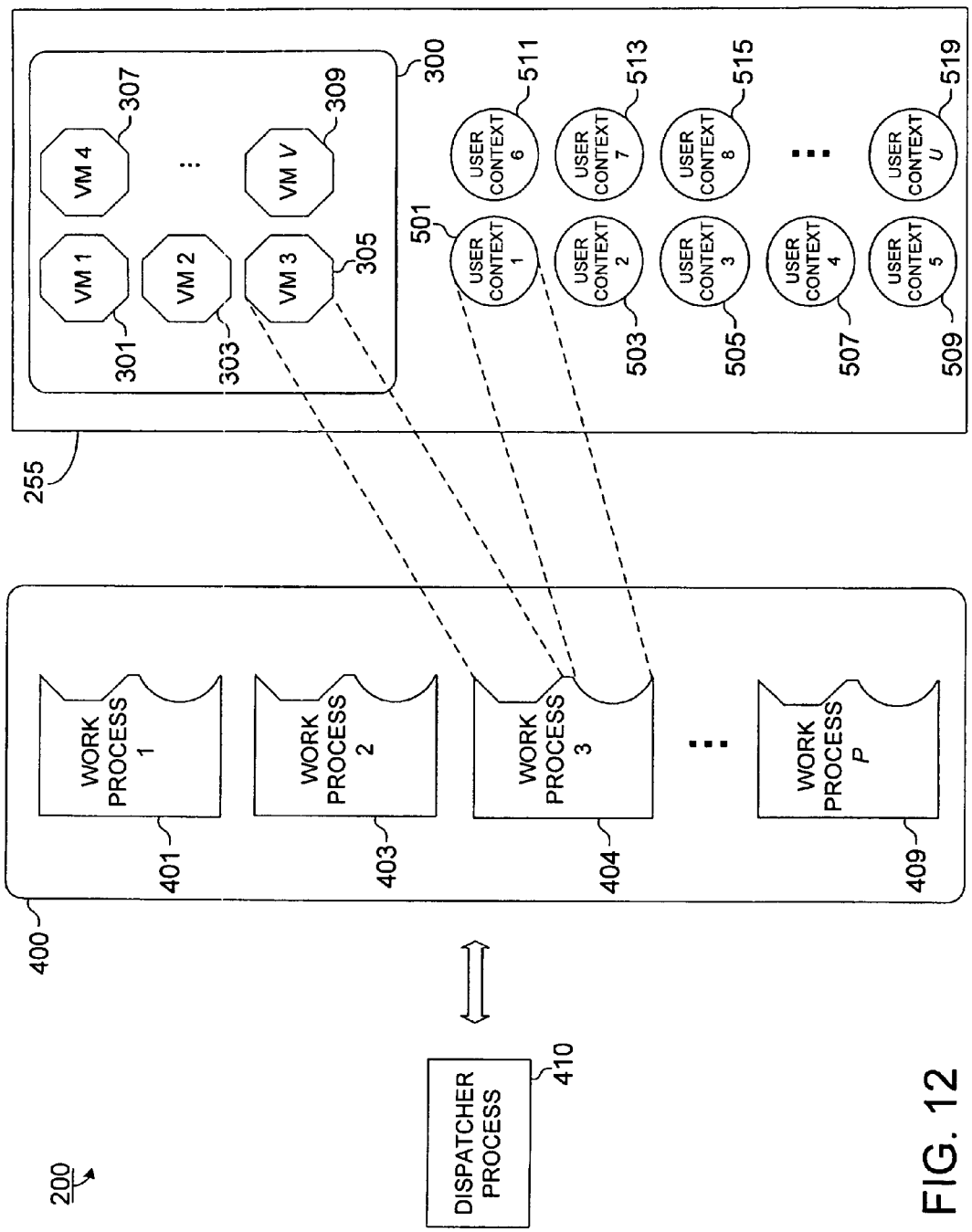
FIG. 12 is a block diagram of another server in the client/server system of FIG. 1.

FIG. 12 illustrates a different implementation of a server 200 that may be more practical to use in an environment where user contexts are expected to be fairly small. Instead of creating one VM for each user session, the implementation of the server 200 shown in FIG. 12 uses a pool 300 of shared VMs (e.g., VMs 301, 303, 305, 307, and 309). The server 200 creates a user context for each user session (e.g., user contexts 501, 503, 505, 507, 509, 511, 513, 515, and 519). The user contexts are stored in a shared memory area 255, as are the VMs in the pool 300 of VMs. As with the implementations discussed previously, the server 200 uses a pool 400 of work processes (e.g., work processes 401, 403, 404, and 409), and a dispatcher process 410.

In operation, the implementation of the server 200 shown in FIG. 12 works as follows. When the server 200 receives a user request, the dispatcher process 410 selects an available work process from the pool 400 of work processes (e.g., work process 404), and dispatches the user request to the selected work process 404. The work process 404 then selects an available VM from the pool 300 of VMs (e.g., VM 305). The selected VM 305 is then bound to the selected work process 404, e.g., by mapping the VM 305 from the shared memory 255 into the address space of the selected work process 404.

Next, the work process 404 identifies the user session and the associated user context (e.g., user context 501) that correspond to the user request. The identified user context 501 is then bound to the work process 404, e.g., by copying the user context 501 from the shared memory area 255 into the address space of the work process 404. Now the user request can be processed by executing the VM 305 in the work process 404 in association with the user context 501.

Other implementations are possible for identifying the relevant user context and associating that context with the selected VM. For example, the dispatcher process 410 can identify the relevant user context and pass information identifying that context to the selected VM, and the user context (e.g., the shared closure of objects that make up that context) can then be mapped or copied into the address space of the selected work process on behalf of the selected VM. Conceptually, this can be thought of as a sequence in which the identified user context is plugged into the selected VM, and the selected VM is then plugged into the selected work process, although from a technical point of view this conceptual sequence can be carried out by simply mapping or copying the sections of shared memory that represent the selected VM and the identified user context into the address space of the selected work process.

When the request has been processed, the VM 305 and the user context 501 are unbound from the work process 404 (e.g., by unmapping the VM 305 from the work process 404, and copying the user context 501 back to the shared memory area 255). The VM 305 and the work process 404 are then marked as being available again, and they can be used to process additional requests received by the server 200. Of course, the VM 305 and the work process 404 may not be paired together in the processing a new request—for example, if a new request is dispatched to the work process 404 and the VM 305 is busy processing another request, the work process 404 must select another VM from the pool 300 of VMs (or wait for a VM in the pool 300 of VMs to become available).

In this manner, the VMs in the server implementation shown in FIG. 12 are shared (i.e., the server does not allocate one VM per user session), yet isolated from each other, since each VM is dedicated to only one user session at a time. Moreover, since each VM runs in an isolated process, if a VM crashes, such a crash may affect only the user session corresponding to the request that was being processed in the crashed VM (depending on how well the operating system isolates processes from each other). Consequently, this approach of using a pool of shared but dedicated VMs results in a robust server, but with less overhead than the implementations discussed previously.

Various optimizations can be used to achieve the same benefit—reduced overhead—in a server implementation in which one VM is allocated for each user session. For example, instead of terminating VMs at the end of their corresponding user session, the VMs can be reused. That is, a VM can be associated with a different user session and used to process requests corresponding to the new user session. Though helpful, this approach nevertheless still requires significant overhead when there are a large number of simultaneous user sessions, since the server needs to instantiate at least one VM for each user session.

In contrast, the server implementation shown in FIG. 12 limits the number of VMs to however many VMs are allocated to the VM pool 300. As discussed previously, this implementation is well-suited to environments with a large number of simultaneous user sessions and small user contexts. Such environments can generally be characterized by the equation $P<=V<<U$, where P is the number of work processes allocated to the pool of work processes 400, V is the number of VMs allocated to the pool of VMs, and U is the number of user sessions being handled by the server. The left part of this equation indicates that the number of VMs allocated to the pool of VMs should generally be greater than or equal to the number of work processes in the pool of work processes (since otherwise there would be some idle, unused processes even when all the VMs are being used). The right part of the equation indicates that the number of VMs can be significantly less than the number of user sessions. Again, this is possible because each VM can be shared by the different user sessions, though not at the same time.

The implementation of the server 200 shown in FIG. 12 is enabled by the sharing of objects between VMs. In the server implementation shown in FIG. 3, each user context (e.g., user context 301) is associated with one VM (e.g., VM 501) for the lifetime of the corresponding user session, and that user context and its associated VM are both mapped into a work process when a user request is received from the corresponding user session. Thus, in the implementation in FIG. 3, each VM is associated with one user session, and the VM can only access the associated user context—it is not possible for the VM to access a user context corresponding to another session. For example, the VM 301 can only access the user context 501, and the VM 303 can only access the user context 503. Consequently, each VM can only process requests corresponding to its associated user context.

The sharing techniques discussed above, however, make it possible for VMs to share objects, including objects that make up a user context. For example, a user context can be stored as a shared closure in a shared memory heap. The shared closure—and hence the user context—can then be accessed by multiple VMs.

The server implementation shown in FIG. 12 can accordingly be described as follows: first, VMs and user contexts are dissociated from each other; second, user contexts are stored in a shared memory heap that can be accessed by all the VMs in the VM pool; and finally, user requests are processed by mapping the corresponding user context and an available VM into an available work process.

Figure 13:
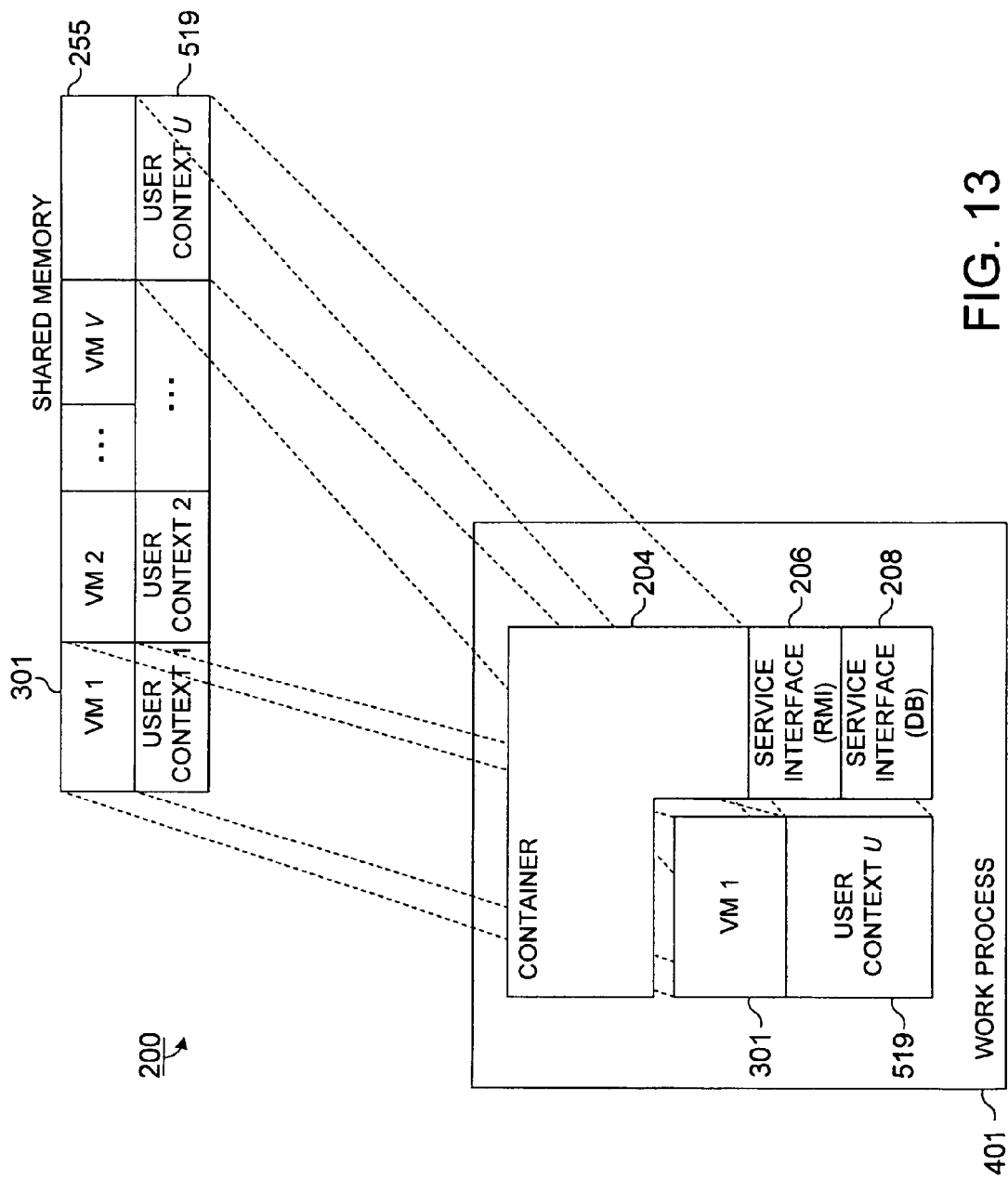
FIG. 13 is another block diagram of the server in FIG. 12.

The above scheme is shown conceptually in FIG. 13. As in FIG. 3, the VMs and user contexts in FIG. 13 are stored in a shared memory area 255. Unlike in FIG. 3, however, the VMs in FIG. 13 are no longer associated with a particular user context—any available VM can work with any user context. For example, in FIG. 3, the VM 301 can only work with its associated user context 501. In contrast, in FIG. 13, the VM 301 can work with any of the user contexts in shared memory, e.g., the user context 519.

In some implementations, once a VM has been paired with a user context, the VM must remain paired with the user context until the corresponding user request has been processed. In particular, a VM cannot be marked as available and used to process another user request, even if the VM is currently blocked (e.g., because it is waiting for an I/O event) in the processing of the current user request.

For example, in a Java implementation, it is not easy to separate a VM (which includes a VM heap and a VM stack) from a user context (which includes a user heap and a user stack) while a request is being processed, because the VM stack is intermixed with the user stack. Hence, the VM must remain paired with the user context until the corresponding request is processed and the user stack becomes empty.

Figure 14:
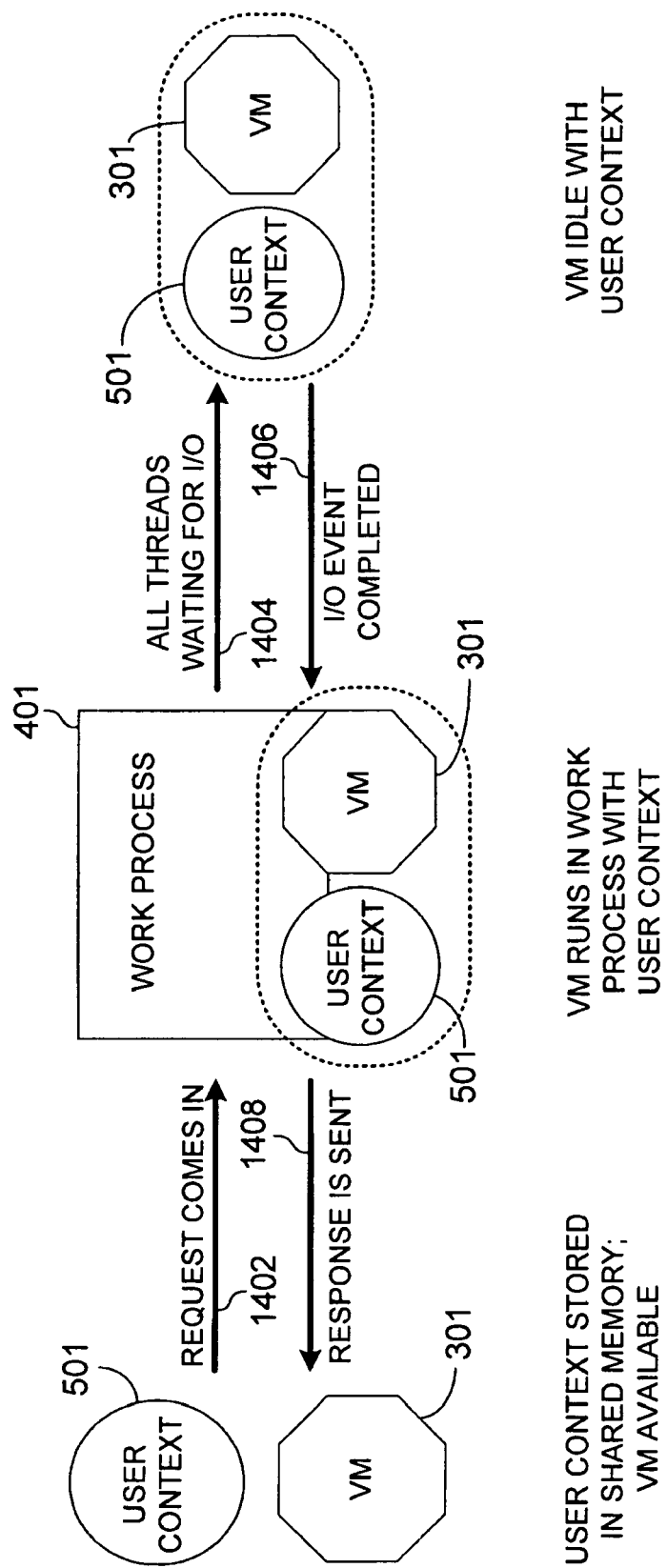
FIG. 14 is a block diagram illustrating the processing of a request in the server of FIG. 12.

FIG. 14 illustrates the pairing of a VM and a user context according to the above scheme. Before the server receives a request corresponding to the user context 501, the user context 501 is stored in shared memory, and the VM 301 is available to process requests corresponding to any user context. When the request corresponding to the user context 501 is received (1402), the user context 501 and the VM 301 are both bound to a work process 401. The user context 501 and the VM 301 are thus paired with each other as the VM runs in the work process 401 with the user context 501.

At some point in the processing of the request, all the threads or co-routines in the VM may block (e.g., if they are all waiting for an I/O event to complete). When that happens (1404), the VM 301 and the user context 501 are unbound from the work process 401, thereby freeing the work process 401 to work on another request. The VM 301 is not marked as available, however—it remains paired with the user context 501, and stays idle until at least one thread is able to run again (e.g., when the indicated I/O event completes). When that happens (1406), the VM 301 and the user context 501 can again be bound to a work process, so that the VM can continue to execute with the user context. The VM 301 and the user context 501 may not be bound to the same work process 401 that they were bound to previously—e.g., if another VM is currently bound to the work process 401, the VM 301 and the user context 501 are bound to another work process that is available.

Finally, when the request has been processed and the response sent (1408), the VM 301 and the user context 501 are unbound from the work process. The user context 501 is again stored in shared memory, and the VM 301 and the work process are both marked as being available to work on another request.

Figure 15:
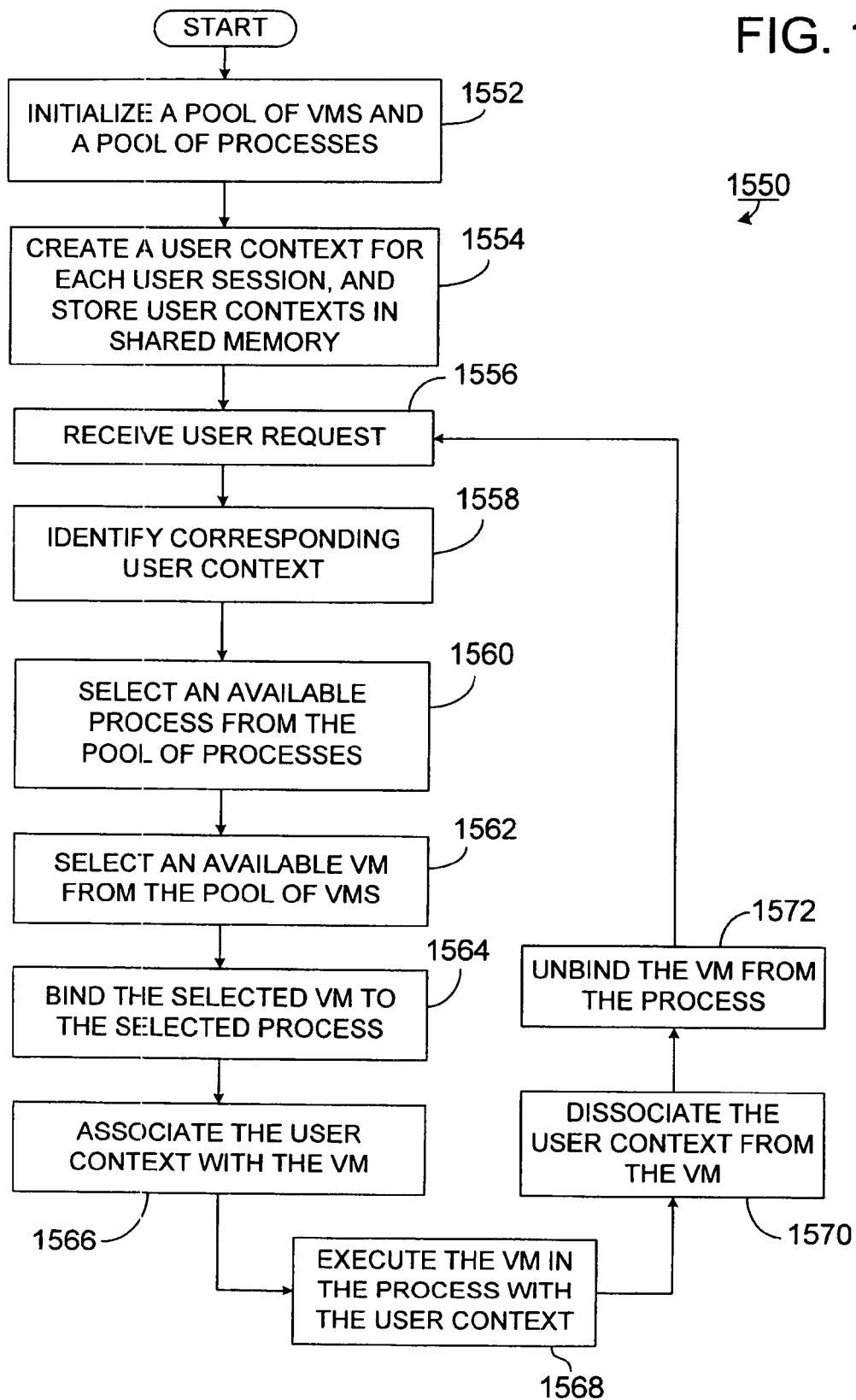
FIG. 15 is a process flowchart illustrating the processing of requests in the server of FIG. 12.

FIG. 15 is a flowchart illustrating a sample process 1550 for processing requests in the server implementation shown in FIG. 12. In the process 1550, a pool of operating system processes and a pool of VMs are first initialized (1552). A user context is created for each user session, and stored in a shared memory area in the server (1554). Each user context can be stored, for example, as a shared closure of objects.

When the server receives a request from a user session (1556), it identifies the corresponding user context (1558), and selects an available process from the pool of work processes (1560) and an available VM from the pool of VMs (1562). The selected VM is then bound to the selected process (1564) (e.g., by mapping the VM from the shared memory area into the address space of the selected process). Before the VM can be used to process the request, the user context must be associated with the VM (1566). This can be done, for example, by binding the user context to the selected process. As described above, in one implementation, access to the objects in a shared closure is not restricted if the shared closure is copied into a process, but restricted to read-only access if the shared closure is mapped into the process. In such an implementation, user contexts are copied rather than mapped into processes, since a VM is likely to need to modify a user context in the course of processing a request. Other implementations are possible, however—for example, a user context can be mapped into a process, and a locking variable can be set to prevent other processes or VMs from accessing the objects in the user context while the VM in the mapping process uses and possibly modifies those objects. Additional variations are possible for giving the selected VM and process exclusive access to the user context.

Once the selected VM has been bound to the selected process and the user context has been associated with the VM, the request can be processed by executing the VM in the process with the user context (1568). As described above, in one implementation, if the VM blocks and is not able to continue processing for some reason (e.g., if the VM is waiting for an I/O event to occur), the VM can be unbound from the work process. The work process can then be marked as available and used to work on another request. The VM can also be marked as available and used to process another request, unless it is not possible to dissociate the VM from the user context until processing of the user request has been completed. In the latter scenario, the VM must remain paired with the user context. When the VM is no longer blocked, the VM and the user context can again be bound to an available work process, and the VM can continue with the processing of the user request.

When the user request has been processed, the operations of binding the VM to the work process and associating the user context with the VM can be reversed—e.g., the user context can be dissociated from the VM (1570), and the VM can be unbound from the work process (1572). The manner in which the user context is dissociated from the VM depends on the manner in which the user context was associated with the VM. As described above, in one implementation, the user context is copied into the process that is bound to the VM, in which case the user context can be dissociated from the VM by copying the user context back into the shared memory area. As also described previously, in some implementations, copying the user context to the shared memory area can result in the creation of a new version of the user context if a prior version of the user context still exists in the shared memory area. Like binding the VM to the work process, unbinding the VM from the work process can also be a simple, low cost operation: The VM's block of shared memory can simply be unmapped from the address space of the work process.

After the user context has been dissociated from the VM and the VM has been unbound from the work process, the VM and the work process can both be marked as available, and used by the server to process other requests.

The operations in the process 1550 can be performed in different sequences (e.g., the selection of an available process can occur either before, after, or even at the same time as the selection of an available VM) and by different components of the server. For example, a dispatcher process (e.g., the dispatcher process 410 in FIG. 12) can select an available work process, and simply transmit a user request to the selected process, leaving it up to the process to select an available VM, bind the VM to the process, identify the user context that corresponds to the user request, and associate the user context with the selected VM. Alternatively, the dispatcher process can perform some of those operations itself—e.g., the dispatcher process can select an available VM, identify the relevant user context, and send an identification of the selected VM and the identified user context to the work process. Other alternatives are possible, in which the dispatcher process, the work processes, or additional components in the server perform the operations.

Figure 16:
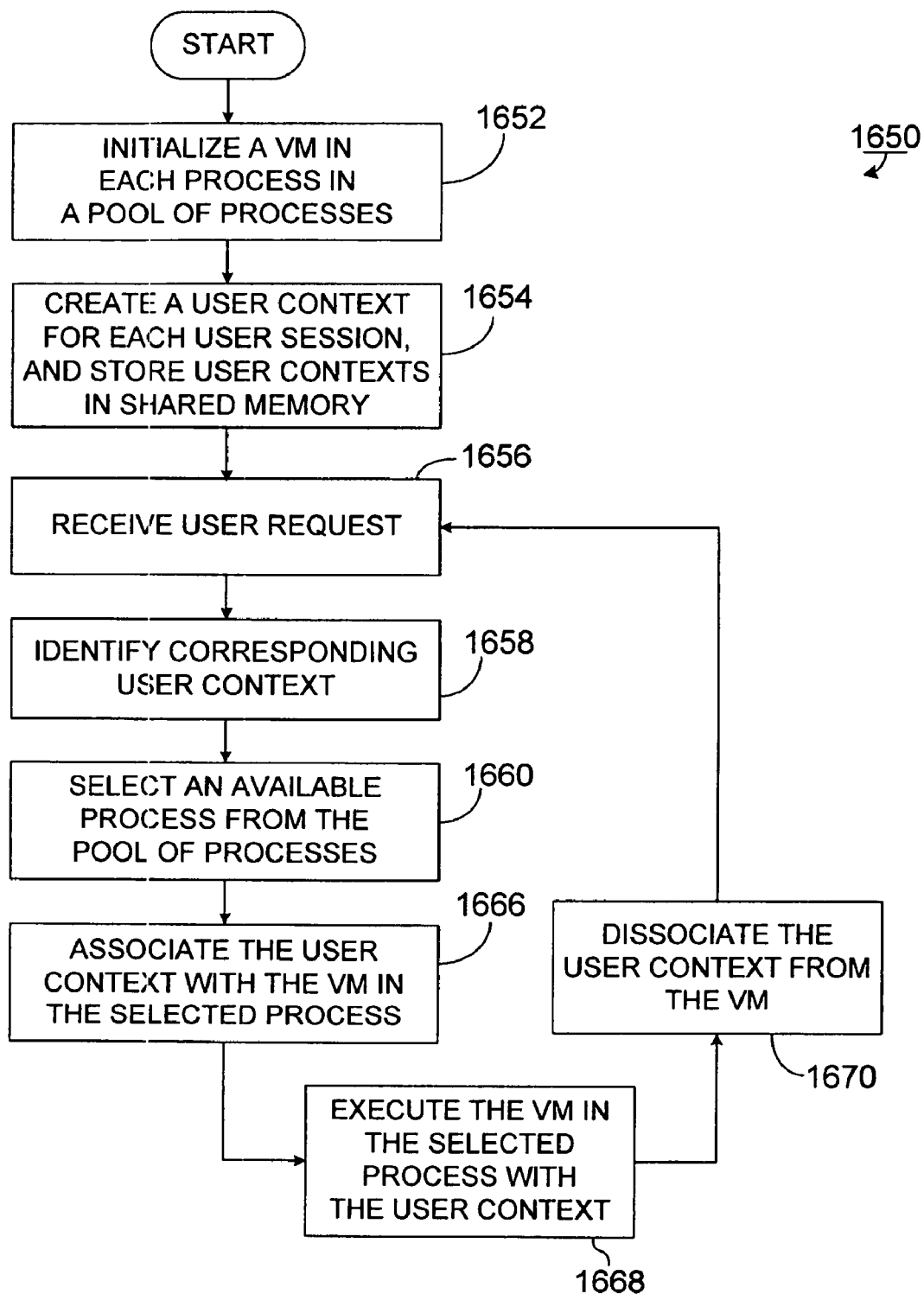
FIG. 16 is a process flowchart illustrating the processing of requests in another server in the client/server system of FIG. 1.

The techniques described above, including the sharing of objects and user contexts, can also be used in other environments. For example, the techniques can be used in a server implementation where VMs are not attached to and detached from processes. FIG. 16 is a flowchart illustrating a sample process 1650 for processing requests in such a server. In the process 1650, a pool of work processes is allocated to the server, and a VM is initialized in each of the work processes (1652). Each VM is bound to its work process for the lifetime of the VM, meaning that the VM cannot be detached from the work process and attached to another work process.

As in the process 1550, a user context is created for each user session and stored in a shared memory area in the server (1654). When the server receives a request from a user session (1656), it identifies the corresponding user context (1658), and selects an available process from the pool of work processes (1660). The user context is then associated with the VM in the selected process (1666) (e.g., by binding the user context to the selected process). The request can then be processed by executing the VM in the selected process with the user context (1668). When the user request has been processed, the user context can be dissociated from the VM (1670) (e.g., by copying the user context from the selected process back to the shared memory area). The work process (and its associated VM) can then be marked as available and used by the server to process other requests.

As can be seen from a comparison of FIGS. 15 and 16, the processes 1550 and 1650 are similar, except that the latter process does not include the operations of binding and unbinding VMs from work processes. Though the process 1650 includes fewer operations, a server that implements that process—i.e., one in which VMs are not attached to and detached from work processes—is not likely to be as efficient as a server that uses process-attachable VMs, because when a VM blocks in the former server, the work process in which the VM is executing cannot be used to process other requests. In contrast, in a server with process-attachable VMs, when a VM blocks, that VM can be detached from its work process, and another VM can be attached in its place and used to work on another request.

Various alternatives and optimizations of the techniques described in this specification are possible. For example, resource consumption and performance can be further improved by storing data that is common to all VMs in shared memory, and mapping such data into all work processes. If type information (e.g., the runtime representation of loaded Java classes) is shared in this manner, the overhead for class loading, verification, and resolution for each VM can be reduced.

As another example, alternative mechanisms can be used to share data and information (including both VMs and user contexts)—e.g., information can be shared through the use of files or messaging systems rather than shared memory. Such mechanisms may not be as desirable as shared memory, however, as they may require more complicated or expensive operations to persist and unpersist the information to be shared.

As yet another example, the processes described herein do not require the particular order shown, or sequential order, to achieve desirable results. For instance, in the processes depicted in FIGS. 15 and 16, the operations to create, identify, and associate user contexts with VMs can be performed at many different places within the overall processes. In certain implementations of the processes described herein, multitasking and parallel processing may be preferable.

Moreover, various components or entities can be used to perform the operations in the processes described herein. For example, the operations in the process 1550 can be performed by different components within a server. For instance, in one implementation, a dispatcher process (e.g., the dispatcher process 410 in FIG. 12) selects an available work process, and simply transmits a user request to the selected process, leaving it up to the process to select an available VM, bind the VM to the process, identify the user context that corresponds to the user request, and associate that user context with the selected VM. Alternatively, the dispatcher process can perform some of those operations itself—e.g., the dispatcher process can select an available VM, identify the relevant user context, and send an identification of the selected VM and the identified user context to the work process. Other alternatives are possible, in which the dispatcher process, the work processes, or additional or different components in the server perform the operations. For example, a server can be implemented without a dispatcher process, and another mechanism can be used to distribute requests between work processes.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described herein, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention can be implemented in a computing system that includes a back-end component (e.g., a data server), a middleware component (e.g., an application server), or a front-end component (e.g., a client computer having a graphical user interface or a Web browser through which a user can interact with an implementation of the invention), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments, but other embodiments can be implemented and are within the scope of the following claims. For example, as described above, the operations of the invention can be performed in a different order and still achieve desirable results. Other embodiments are within the scope of the following claims.

The invention claimed is:

1. A machine-readable storage device comprising instructions which, when executed by a computer, cause the computer to:

initialize on the computer a first runtime system and a second runtime system,
wherein the first runtime system and the second runtime system are one of a Java virtual machine or a common language runtime virtual machine;

create a shared closure of a set of data objects in a shared memory area, the shared closure of the set of data objects including a first data object and a transitive closure including a reference object referenced by the first data object;

associate the shared closure of the set of data objects with the first runtime system by identifying the set of data objects, each data object in the set of data objects comprising a reference to runtime metadata about the data object in the first runtime system and replacing the reference to the runtime metadata in the data object with a proxy for each data object in the set of data objects, wherein identifying comprises identifying the transitive closure of a referenced data object;

transmit the set of data objects to the second runtime system for sharing information, wherein transmitting includes replacing the proxy with the reference to the runtime metadata for each of the set of data objects transmitted to the second runtime system, if the reference to the runtime metadata is loaded in the second runtime system, wherein for each data object in the set of data objects, the reference to the runtime metadata about the data object comprises a reference to a runtime representation of a class of which the data object is an instance, and wherein for each data object in the set of data objects:

determining whether the runtime representation of the class of which the data object is an instance is available in the second runtime system, and if the runtime representation of the class of which the data object is an instance is not available in the second runtime system, installing the runtime representation of the class of which the data object is an instance in the second runtime system; and associate the shared memory with the first runtime system and the second runtime system such that the first runtime system and the second runtime system share user information at the shared memory.

2. The machine-readable storage device of claim 11 wherein the first runtime system comprises a first virtual machine and the second runtime system comprises a second virtual machine.

3. The machine-readable storage device of claim 1, wherein the first runtime system is located on a first physical machine and the second runtime system is located on a second, distinct physical machine.

4. The machine-readable storage device of claim 1, wherein the user information comprises user context information associated with a user session.

5. A computer-implemented method comprising:

initializing on the computer a first runtime system and a second runtime system,
wherein the first runtime system and the second runtime system are one of a Java virtual machine or a common language runtime virtual machine:

creating a shared closure of a set of data objects in a shared memory area, the shared closure of the set of data objects including a first data object and a transitive closure including a reference object referenced by the first data object;

associating the shared closure of the set of data objects with the first runtime system by identifying the set of data objects, each data object in the set of data objects comprising a reference to runtime metadata about the data object in a first runtime system and replacing the reference to the runtime metadata in the data object with a proxy for each data object in the set of data objects, wherein identifying comprises identifying the transitive closure of a referenced data object;

transmitting the set of data objects to the second runtime system for sharing information, wherein transmitting includes replacing the proxy with the reference to the runtime metadata for each of the set of data objects transmitted to the second runtime system, if the reference to the runtime metadata is loaded in the second runtime system, wherein for each data object in the set of data objects, the reference to the runtime metadata about the data object comprises a reference to a runtime representation of a class of which the data object is an instance, and wherein for each data object in the set of data objects:

determining whether the runtime representation of the class of which the data object is an instance is available in the second runtime system. and if the runtime representation of the class of which the data object is an instance is not available in the second runtime system. installing the runtime representation of the class of which the data object is an instance in the second runtime system; and associating the shared memory with the first runtime system and the second runtime system such that the first runtime system and the second runtime system share user information at the shared memory.

6. The computer-implemented method of claim 5, wherein the first runtime system comprises a first virtual machine and the second runtime system comprises a second virtual machine.

7. The computer-implemented method of claim 5, wherein the first runtime system is located on a first physical machine and the second runtime system is located on a second, distinct physical machine.

8. The computer-implemented method of claim 5, wherein the user information comprises user context information associated with a user session.

* * * * *

UNITED STATES PATENT AND TRADEMARK OFFICE
CERTIFICATE OF CORRECTION

PATENT NO. : 7,587,721 B2  
APPLICATION NO. : 10/851813  
DATED : September 8, 2009  
INVENTOR(S) : Schmidt et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1511 days.

Signed and Sealed this

Twenty-first Day of September, 2010

David J. Kappos  
*Director of the United States Patent and Trademark Office*